(12) United States Patent
Kay

(10) Patent No.: US 9,787,556 B2
(45) Date of Patent: Oct. 10, 2017

(54) APPARATUS, SYSTEM, AND METHOD FOR ENHANCED MONITORING, SEARCHING, AND VISUALIZATION OF NETWORK DATA

(71) Applicant: Cpacket Networks Inc., Mountain View, CA (US)

(72) Inventor: Rony Kay, Cupertino, CA (US)

(73) Assignee: cPacket Networks Inc., Mountain View, CA (US)

( * ) Notice: Subject to any disclaimer, the term of this patent is extended or adjusted under 35 U.S.C. 154(b) by 424 days.

(21) Appl. No.: 14/580,138

(22) Filed: Dec. 22, 2014

(65) Prior Publication Data

US 2015/0244594 A1 Aug. 27, 2015

Related U.S. Application Data

(60) Provisional application No. 61/924,653, filed on Jan. 7, 2014.

(51) Int. Cl.
*H04L 1/00* (2006.01)
*H04L 12/26* (2006.01)
(Continued)

(52) U.S. Cl.
CPC ........ *H04L 43/045* (2013.01); *H04L 41/0613* (2013.01); *H04L 43/028* (2013.01); *H04L 43/062* (2013.01); *H04L 67/22* (2013.01); *H04L 67/32* (2013.01); *H04L 43/026* (2013.01); *H04L 43/04* (2013.01); *H04L 43/0852* (2013.01); *H04L 43/0888* (2013.01); *H04L 63/1441* (2013.01)

(58) Field of Classification Search
CPC .................................................. H04L 43/0852
See application file for complete search history.

(56) References Cited

U.S. PATENT DOCUMENTS 7,185,103 B1 2/2007 Jain
7,543,052 B1 6/2009 Klein
(Continued)

OTHER PUBLICATIONS

International Search Report and Written Opinion issued to International Patent Application No. PCT/US14/72137, Apr. 3, 2015, 7 pgs.
(Continued)

*Primary Examiner* — Vivek Srivastava
*Assistant Examiner* — Nicholas Celani
(74) *Attorney, Agent, or Firm* — Cooley LLP

(57) ABSTRACT

A system for monitoring and visualization of network data includes a plurality of first devices and a second device coupled to the plurality of first devices over a network. Each first device is associated with corresponding ones of a plurality of ports. Each first device is configured to determine network traffic analysis information associated with a characteristic of network data traversing each of the ports, and to push the network traffic analysis information across a network independent of a solicitation from the network. The second device is configured to generate a map of the network including a visual indicator based on the network traffic analysis information, to receive an update of the network traffic analysis information from at least one of the first devices, and to refresh the visual indicator in real time to reflect the update of the network traffic analysis information.

18 Claims, 22 Drawing Sheets

(51) Int. Cl.
*H04L 12/24* (2006.01)
*H04L 29/08* (2006.01)
*H04L 29/06* (2006.01)

(56) References Cited

U.S. PATENT DOCUMENTS

| | | |
|---|---|---|
| 2003/0086425 A1 | 5/2003 | Bearden et al. |
| 2007/0074288 A1* | 3/2007 | Chang .................. H04L 43/028 726/22 |
| 2009/0238088 A1 | 9/2009 | Tan |
| 2010/0008359 A1* | 1/2010 | Kay .................... H04L 63/1416 370/389 |
| 2010/0011101 A1* | 1/2010 | Kay .................... H04L 63/1416 709/224 |
| 2010/0039957 A1* | 2/2010 | Kotrla ................ H04L 41/5009 370/253 |
| 2011/0161500 A1 | 6/2011 | Yengalasetti et al. |
| 2013/0343213 A1 | 12/2013 | Reynolds et al. |

OTHER PUBLICATIONS

Supplementary European Search Report issued to European Patent Application No. 14877647.9, Jul. 14, 2017, 9 pgs.

* cited by examiner

| Rank | Network Device Identifier | Port Identifier | Search Term | String = "AQUA" |
|---|---|---|---|---|
| | | | Number of Occurrences | |
| 1 | A | 2 | 18 | |
| 2 | B | 7 | 16 | |
| 3 | C | 5 | 12 | |
| 4 | D | 6 | 11 | |
| ... | | | | |

FIG. 3A

Search Term | Condition = "Microburst"

| Rank | Network Device Identifier | Port Identifier | Number of Occurrences |
|---|---|---|---|
| 1 | B | 4 | 8 |
| 2 | C | 2 | 7 |
| 3 | D | 6 | 4 |
| 4 | C | 5 | 2 |
| ... | | | |

FIG. 3B

Search Term | Condition = "Data Rate > 1 Gbps"

| Rank | Network Device Identifier | Port Identifier | Measured Data Rate |
|---|---|---|---|
| 1 | A | 4 | 4 Gbps |
| 2 | C | 3 | 3.8 Gbps |
| 3 | D | 2 | 3.4 Gbps |
| 4 | E | 7 | 3.1 Gbps |
| ... | | | |

FIG. 3C

Example of CWR Rule Engine Execution Sequence

| Addr State ID | Opcodes Operation and configuration | Operands Values to compare against | Next Address | Control |
|---|---|---|---|---|
| 0 | Initialization & cleanup of internal states (E.g., set global control for ECP override such that next (i.e., next address) is 5 if SEGMENT is a separator between packets)* | | | |
| 1 | Compare SEGMENT for equality | To Value: 'ab' | If equal: next = 2 otherwise: next = 1 | advance SEGMENT |
| 2 | Compare SEGMENT for equality | To Value: 'cd' | If equal: next = 3 otherwise: next = 1 | advance SEGMENT same SEGMENT |
| 3 | Range check for the SEGMENT and Compare SEGMENT for equality | Range Lower Bound: 10 Range Upper Bound: 14 Equality operand: 'ab' | case in range: next = 4 case not in range & equal: next = 2 otherwise: next = 1 | advance SEGMENT advance SEGMENT same SEGMENT |
| 4 | End State Match | | Next = 0 | Done, match |
| 5 | End State NO Match | | Next = 0 | Done, NO match |

* when the SEGMENT is equal to a separator between packets ('--') it causes the next address to End State NO Match

FIG. 12

APPARATUS, SYSTEM, AND METHOD FOR ENHANCED MONITORING, SEARCHING, AND VISUALIZATION OF NETWORK DATA

CROSS-REFERENCE TO RELATED APPLICATIONS

This application claims priority to U.S. Provisional Patent Application No. 61/924,653 filed on Jan. 7, 2014.

This application is related to (1) U.S. Ser. No. 11/208,022, filed on Aug. 19, 2005, now U.S. Pat. No. 7,937,756; (2) U.S. Ser. No. 11/483,265, filed on Jul. 7, 2006, now U.S. Pat. No. 8,024,799; (3) U.S. Ser. No. 11/483,196, filed on Jul. 7, 2006, now U.S. Pat. No. 7,882,554; (4) U.S. Ser. No. 11/483,251, filed on Jul. 7, 2006, now U.S. Pat. No. 7,890,991; (5) U.S. Ser. No. 12/500,493, filed on Jul. 9, 2009; (6) U.S. Ser. No. 12/500,519, filed on Jul. 9, 2009, now U.S. Pat. No. 8,296,846; (7) U.S. Ser. No. 12/500,527, filed on Jul. 9, 2009, now U.S. Pat. No. 8,346,918; (8) U.S. Ser. No. 14/097,173, filed on Dec. 4, 2013; (9) U.S. Ser. No. 14/097,176, filed on Dec. 4, 2013; (10) U.S. Ser. No. 14/097,178, filed on Dec. 4, 2013; (11) U.S. Ser. No. 14/097,181, filed on Dec. 4, 2013; and (12) U.S. Provisional Patent Application No. 61/924,655 filed Jan. 7, 2014. The contents of each of the above related applications are incorporated by reference in their entirety.

FIELD OF THE INVENTION

The present invention relates generally to network performance monitoring. More particularly, this invention relates to enhanced reporting and measurement of performance data.

BACKGROUND OF THE INVENTION

The pervasive use of computer networks to increase productivity and to facilitate communication makes network traffic monitoring, network analysis, and network security important concerns. The traffic load and the number of data flows traversing networks and data centers are rapidly increasing, which results in a rapidly increasing number of data flows, services, and performance counters to be monitored by network management architectures. For some packet data flows, it may be sufficient to monitor performance metrics per flow, such as bytes transmitted or received, at a time granularity of one second. This is a common configuration for typical network management architectures such as Simple Network Management Protocol (SNMP) architectures. However, for other packet data flows, it can be important to monitor performance metrics per flow at a finer time granularity, such as 1 millisecond or 10 milliseconds, as there are phenomena that can significantly impact quality of service of a flow that can be visible at these finer time granularities, but that are not visible at a one second time granularity. Typical SNMP stacks may not be designed for, and may not scale well to, this level of fine-grain monitoring across a large number of network devices that may be deployed worldwide. In addition, typical network management systems may not provide a user interface that allows for flexible, efficient analysis of large quantities of network monitoring data.

It is against this background that a need arose to develop the apparatus, system and method for enhanced reporting and measurement of performance data described herein.

SUMMARY OF THE INVENTION

One aspect of the invention relates to a system for monitoring and visualization of network data. In one embodiment, the system includes a plurality of first devices and a second device coupled to the plurality of first devices over a network. Each of the plurality of first devices is associated with corresponding ones of a plurality of ports. Each of the plurality of first devices is configured to determine network traffic analysis information associated with a characteristic of network data traversing each of the plurality of ports, and to push the network traffic analysis information across a network independent of a solicitation from the network. The second device is configured to generate a map of the network including a visual indicator based on the network traffic analysis information, to receive an update of the network traffic analysis information from at least one of the plurality of first devices, and to refresh the visual indicator in real time to reflect the update of the network traffic analysis information.

In another embodiment, the system includes a first device and a plurality of second devices coupled to the first device. Each of the plurality of second devices is associated with corresponding ones of a plurality of ports. Each of the plurality of second devices is configured to determine network traffic analysis information associated with a characteristic of network data traversing each of the plurality of ports in response to a communication from the first device. The first device is configured to receive a search request implicating the characteristic, to generate the communication based on the search request, to generate a network map including a visual indicator based on the network traffic analysis information, to receive an update of the network traffic analysis information from at least one of the plurality of second devices, and to refresh the visual indicator in real time to reflect the update of the network traffic analysis information.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of the invention, reference should be made to the following detailed description taken in conjunction with the accompanying drawings, in which:

FIGS. 3A through 3C illustrate examples of displays showing a search request implicating a characteristic of network traffic analysis data, and a ranking of ports in response to the search request, in accordance with an embodiment of the invention;

FIG. 12 illustrates an example of an execution sequence of microcode instructions to implement a comparison rule, in accordance with an embodiment of the invention;

DETAILED DESCRIPTION OF THE INVENTION

Figure 1:
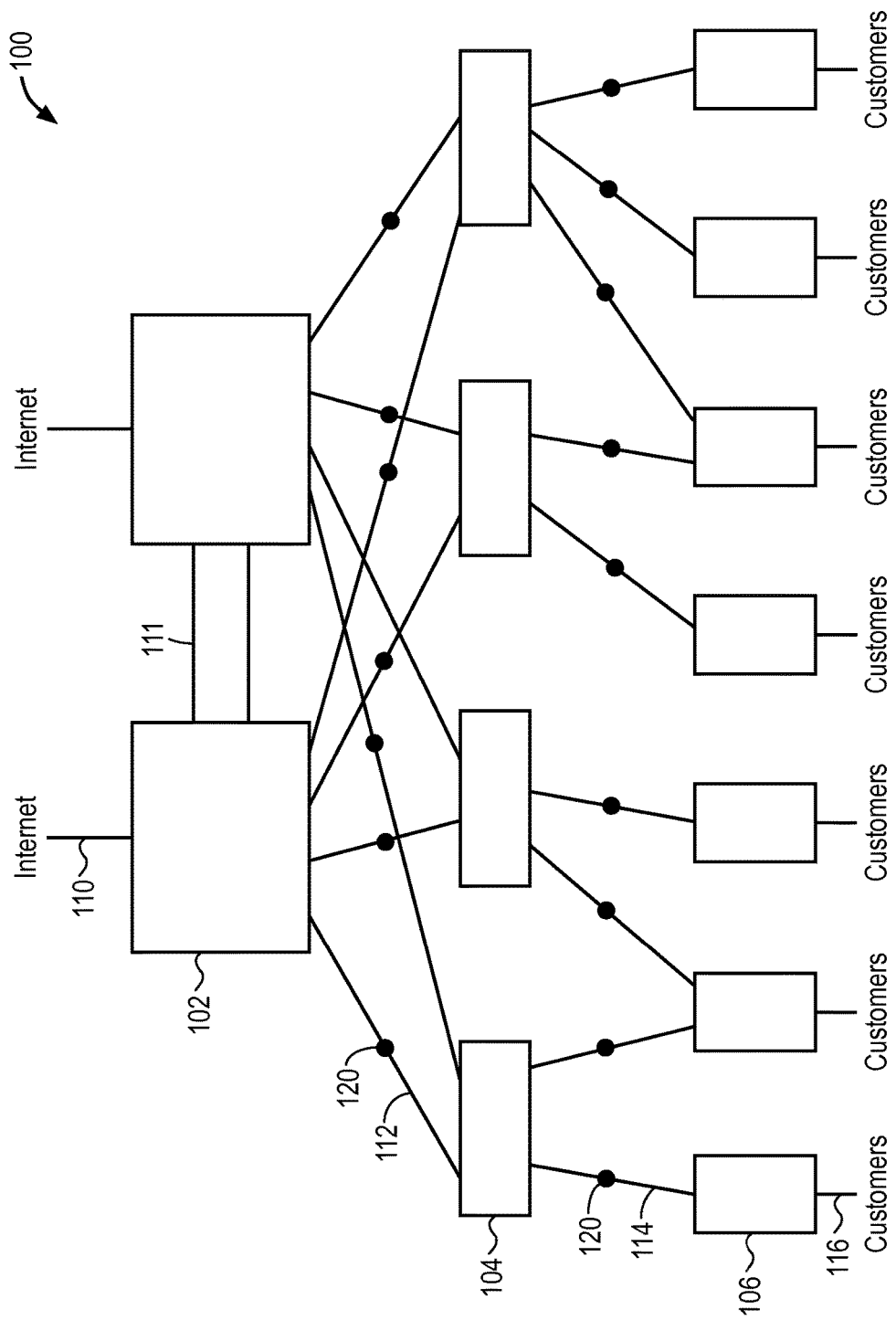
FIG. 1 illustrates an example of a network with representative locations at which a network device can be connected, in accordance with an embodiment of the invention.

FIG. 1 illustrates an example of a network 100 with representative locations 120 at which a network device can be connected, in accordance with an embodiment of the invention. The network 100 is an example of a network that may be deployed in a data center to connect customers to the Internet. The connections shown in FIG. 1 are bidirectional unless otherwise stated. In one embodiment, the network 100 includes core switches 102, edge routers 104, and access switches 106. The core switches 102 provide connectivity to the Internet through multiple high-capacity links 110, such as 10-Gigabit Ethernet, 10 GEC 802.1Q, and/or OC-192 Packet over SONET links. The core switches 102 may be connected to each other through multiple high-capacity links 111, such as for supporting high availability. The core switches 102 may also be connected to the edge routers 104 through multiple links 112. The edge routers 104 may be connected to the access switches 106 through multiple links 114. The links 112 and the links 114 may be high-capacity links or may be lower-capacity links, such as 1 Gigabit Ethernet and/or OC-48 Packet over SONET links. Customers may be connected to the access switches 106 through physical and/or logical ports 116.

Figure 2:
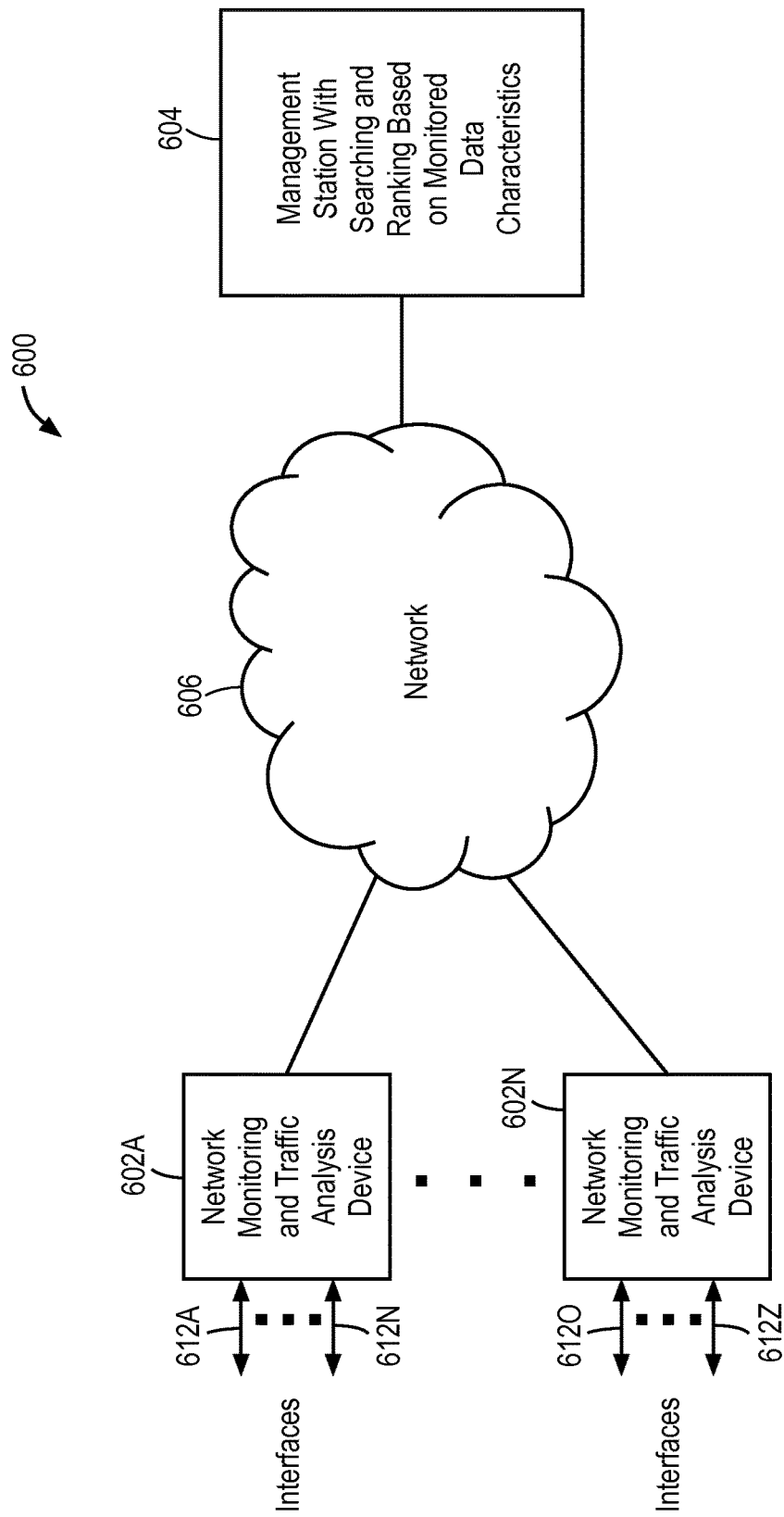
FIG. 2 illustrates a system for network monitoring and network traffic analysis, in accordance with an embodiment of the invention.

FIG. 2 illustrates a system 600 for network monitoring and network analysis, in accordance with an embodiment of the invention. The system 600 includes network devices 602A-602N that monitor and perform analysis, such as of network traffic. The network traffic that is monitored and analyzed by the network devices 602 may enter the network devices 602 through interfaces 612A-612Z. After monitoring and analysis by the network devices 602, the network traffic may exit the network devices through the interfaces 612 if the interfaces 612 are bidirectional, or through other interfaces (not shown) if the interfaces 612 are unidirectional. Each of the network devices 602 may have a large number of high-capacity interfaces 612, such as 32 10-Gigabit network interfaces.

In one embodiment, each of the network devices 602 may monitor and analyze traffic in a corresponding network 100, such as a data center network. Referring to FIG. 1, in one example the interfaces 612 may be connected to the network 100 at corresponding ones of the locations 120. Each of the interfaces 612 may monitor traffic from a link of the network 100. For example, in FIG. 1, one or more network devices 602 may monitor traffic on the links 112 and 114.

The network devices 602 are connected to a management station 604 across a network 606. The network 606 may be a wide area network, a local area network, or a combination of wide area and/or local area networks. For example, the network 606 may represent a network that spans a large geographic area. The management station 604 may monitor, collect, and display traffic analysis data from the network devices 602, and may provide control commands to the network devices 602. In this way, the management station may enable an operator, from a single location, to monitor and control network devices 602 deployed worldwide.

In one embodiment, the management station 604 may receive a search request (search criterion) as input. The search request may implicate a characteristic of network data traversing one or more ports associated with the network devices 602. The one or more ports may be physical ports of the network devices 602, and may correspond to one or more of the interfaces 612. Alternatively, the one or more ports may be logical ports within a single stream of traffic. The characteristic of the network data may take various forms known to one of ordinary skill in the art as relating to network data. For example, the characteristic may be indicated based on occurrence of a bit pattern in the network data and/or based on an occurrence of a pattern of variation in a data rate associated with the network data. Alternatively or in addition, the search request may implicate an operational characteristic of the one or more ports, or an operational characteristic of one or more of the network devices

602. The operational characteristic may take various forms known to one of ordinary skill in the art as relating to operability of network devices. For example, the operational characteristic may be based on existence of an alarm condition of a particular degree of severity, or may be based on configuration information, such as configuration of hardware, software, and/or customer services.

In response to the search request, the management station 604 may process network analysis data received from the network devices 602 via the network 606. The management station 604 may determine which ports, interfaces 612, and/or network devices 602 are implicated by the search request, and may display these ports, interfaces 612, and/or network devices 602, such as in a list or table. In one embodiment, the management station 604 may rank the ports, interfaces 612, and/or network devices 602 that are implicated by the search request, and may display the ports, interfaces 612, and/or network devices 602 in ranked order (see discussion with reference to FIGS. 3A through 3C below). The searching and ranking may be performed based on any algorithm and/or criteria known to one of ordinary skill in the art. For example, in response to a search request for ports with network data traversing the ports that has a particular characteristic, the management station 604 may select a subset of ports across the network devices 602 for which the network data traversing the ports has the characteristic, and may display that subset of ports. The subset of ports may be displayed in ranked order based on a number of times that the characteristic has been detected in the network data traversing the subset of the ports.

Also, in one embodiment, the management station 604 may refresh the display of the ports, interfaces 612, and/or network devices 602 upon a change in the ranking due to dynamic variations in the network analysis data. For example, the management station 604 may dynamically refresh the display of the ports based on real-time variations in the number of times that a characteristic has been detected in the network data traversing the ports.

Network analysis data, as used herein, refers broadly to both network traffic analysis data associated with data traversing one or more network devices (such as the network devices 602), and other network-related data associated with operational characteristics of one or more ports, interfaces, and/or network devices. Network traffic analysis data may, for example, include data associated with evaluation of signature-based and/or behavioral rules applied to network data traversing one or more of the network devices 602. Network traffic analysis data may include statistics (such as performance data) associated with the network data. Examples of these statistics include data related to quantity of the network data and/or quality of the network data, where examples of data quality statistics can include number of errors detected in data traversing a port, and one-way or round-trip network latency associated with data received at a port. Alternatively or in addition, network traffic analysis data may include data derived from additional processing of the data associated with evaluation of rules applied to the network data, or of the statistics associated with the network data. This additional processing may be performed by the network devices 602 to enhance scalability of the network management architecture, as described below.

The network devices 602 may efficiently perform monitoring, filtering, aggregation, replication, balancing, timestamping, and/or modification of network traffic within a unified architecture, based on rules that may be highly granular (such as granular to the bit) anywhere within the network traffic, while at the same time acting as a "bump in the wire" by minimizing perturbation of the network traffic introduced by the network devices 602. By performing at least this wide variety of functions, the network devices 602 may obtain network analysis data that the network devices 602 may provide to the management station 604 to support a wide variety of search requests received by the management station 604. These search requests may relate to a broad range of characteristics of the network traffic and/or network devices. The searching and ranking capability of the management station 604 has a compelling combination of advantages, because this capability can be across network devices 602 deployed worldwide, can be across this broad range of characteristics, and can take into account dynamic changes in search results and/or in ranking of the search results due to dynamic variations in the network analysis data. The searching and ranking capability of the management station 604 can also enable flexible, efficient, and context-based analysis and filtering of the large quantity of network analysis data available at the management station 604.

The network devices 602 may collect network traffic analysis data in various ways. For example, a network device 602 may apply one or more rules to select a data flow (logical port), such as based on a packet header field such as an IP address or a higher-layer identifier such as a Transmission Control Protocol (TCP) port. Alternatively or in addition, the network device 602 may collect statistics associated with the network traffic, such as for data flows (logical ports) and/or physical data ports. Alternatively or in addition, the network device 602 may insert and/or remove a timestamp from one or more packets included in the data flow as part of measuring network latency for the data flow (see discussion with reference to FIG. 5 below). The timestamp insertion and removal may be performed on-the-fly, without capturing the data packets, and without copying the data packets. The search request may be associated with any or all of these types of network traffic analysis data.

A rule is a specific criterion used by the apparatus to determine whether it must react to a unit of data, such as a packet included in a data flow. One type of rule is signature-based. Signatures are sequences of bits anywhere within the digital content of traffic that indicate a characteristic of the traffic of interest to the apparatus. The sequences of bits may be entirely invariant, or may contain portions that are wildcards inessential to rule evaluation. A signature could appear in the header or payload of individual network packets, or across a sequence of packets. A signature may span one or more packet headers and corresponding payloads, and deep packet inspection is used to discover such signatures. Stream inspection is used to discover signatures across a sequence of packets. Both types of inspection are used for total visibility of various types of network traffic.

A second type of rule is behavioral. Two types of behavioral rules are local and network-based behavioral rules. It is contemplated that local behavioral rules can be used to detect changes that can be measured locally at the apparatus. These changes include but are not limited to changes in the volume of traffic or in the balance of inbound and outbound traffic, such as requests and responses, passing through the apparatus. Network-based behavioral rules can be used to detect changes in the network that can be measured in conjunction with other network devices, including but not limited to the apparatus. An example of such a rule is the total traffic volume averaged across multiple points in the network during a specific time period compared to a maximum threshold. Another example is the total number of events of a specific type, such as network error indications, that have occurred across the network during a specific time period, again compared to a maximum threshold. Monitoring of collected statistics for rule evaluation can be important, for example, because a malfunction in the network can be detected based on its impact on network performance or behavior. Alternatively or in addition, a new type of attack can be detected based on its impact on network performance or behavior, even when its signature is unknown.

A third type of rule is both signature-based and behavioral. An example of such a rule is the total number of packets containing a specific signature that have passed through a network device 602 during a specific time period during the day compared to a maximum and/or minimum threshold. The logical port to which a packet (or packets, such as packets included in a data flow) belongs may be determined by applying a rule such as a signature-based rule, a behavioral rule, or a combination of signature-based and behavioral rules to the packet (or packets, such as packets included in a data flow).

In addition to application of rules and statistics collection, the network devices 602 can perform additional functions to enhance scalable reporting of network traffic analysis data across the network 606. In particular, data analysis and processing functions can be partitioned between the network devices 602 and the management station 604 such that the network devices 602 perform significant portions of these functions locally, such as in hardware, reconfigurable logic, and/or in firmware. For example, the network devices 602 can refine statistics collected by the network devices 602, such as statistics associated with data flows, to reduce the volume of the network traffic analysis data to be reported to the management station 604 while maintaining an indication of a characteristic (feature) of the data flows shown in the collected statistics (see discussion with reference to FIGS. 4A through 4C below). In one embodiment, the search and the ranking of the ports, the interfaces 612, and/or the network devices 602 may be based on network traffic analysis data that has been reduced as described above.

Alternatively or in addition, the network devices 602 can process statistics and/or rule-based information collected by the network devices 602, and based on this processing can generate an alert indication to the management station 604. The alert indication may be associated with corresponding ones of the ports, the interfaces 612, and/or the network devices 602 based on detection of a characteristic in the network data traversing the corresponding ones of the ports, the interfaces 612, and/or the network devices 602. In one embodiment, the search and the ranking of the ports, the interfaces 612, and/or the network devices 602 may be based on whether the alert indication is present for each of the ports, the interfaces 612, and/or the network devices 602.

Alternatively or in addition, the network devices 602 can perform mathematical operations on the statistics and/or rule-based information collected by the network devices 602. In one embodiment, these mathematical operations may include at least one of a minimum, a maximum, an average, a convolution, a moving average, a sum of squares, a linear filtering operation, and a nonlinear filtering operation. In one embodiment, the search and the ranking of the ports, the interfaces 612, and/or the network devices 602 may be based on a result of at least one of these mathematical operations on the statistics and/or rule-based information associated with the network data.

The above-described performance of significant portions of data analysis and processing functions at the network devices 602 instead of at the management station 604 has various advantages. Reducing the volume of the network traffic analysis data to be reported to the management station 604 can significantly reduce the per-flow network bandwidth overhead associated with network management. This can be important, given that the traffic load and the number of data flows traversing networks and data centers are rapidly increasing, which results in a rapidly increasing number of performance counters to be monitored by network management architectures. In addition, processing statistics and/or rule-based information collected by the network devices 602 at the network devices 602 can significantly reduce the processing load on the management station 604. This can reduce processing and memory requirements at the management station 604, can simplify software running on the management station 604, and can speed up operation of the management station 604.

In one embodiment, the network analysis data can be reported to the management station 604 through push-based management (see discussion with reference to FIG. 6 below). Push-based management can also significantly reduce network bandwidth overhead by removing overhead due to polling in pull-based management protocols such as the Simple Network Management Protocol (SNMP).

In addition, in today's networks, data flows represent a wide variety of services with a variety of performance requirements. For example, for some packet data flows, it may be sufficient to monitor performance metrics per flow, such as bytes transmitted or received, at a time granularity of one second. This is a common configuration for typical network management architectures such as SNMP architectures. However, for other packet data flows, it can be important to monitor performance metrics per flow at a finer time granularity, such as 1 millisecond or 10 milliseconds, as there are phenomena that can significantly impact quality of service of a flow that can be visible at these finer time granularities, but that are not visible at a one second time granularity. Typical SNMP stacks may not be designed for, and may not scale well to, this level of fine-grain monitoring. In addition, push-based management architectures, by removing polling overhead associated with SNMP, can provide this finer-grain, flow-based monitoring with increased efficiency.

FIGS. 3A through 3C illustrate examples of displays showing a search request implicating a characteristic of network traffic analysis data, and a ranking of ports in response to the search request, in accordance with an embodiment of the invention. FIG. 3A illustrates a display showing a search term, network devices and ports in which a particular string occurs in the data traversing the ports, and a ranking of the ports based on the number of occurrences of the string, in accordance with an embodiment of the invention. In the example of FIG. 3A, the string is "AQUA". The network device identifier and/or the port identifier may be, for example, an IP address, a MAC address, a manufacturer identifier, or an identifier defined by a user, but is not limited to these types of identifiers.

FIG. 3B illustrates a display showing a search term, network devices and ports in which a particular condition (such as a microburst) occurs in the data traversing the ports, and a ranking of the ports based on the number of occurrences of the condition, in accordance with an embodiment of the invention. In the example of FIG. 3B, the condition is a microburst. The network device identifier and/or the port identifier may be, for example, an IP address, a MAC address, a manufacturer identifier, or an identifier defined by a user, but is not limited to these types of identifiers.

FIG. 3C illustrates a display showing a search term, network devices and ports for which a measured data rate traversing the ports exceeds a particular threshold, and a ranking of the ports by measured data rate, in accordance with an embodiment of the invention. In the example of FIG. 3C, the threshold is 1 Gbps. The network device identifier and/or the port identifier may be, for example, an IP address, a MAC address, a manufacturer identifier, or an identifier defined by a user, but is not limited to these types of identifiers.

In one embodiment, referring to FIG. 2, one or more of the network devices 602 may include traffic analysis logic configured to process first data (such as first, unreduced statistical data that may include first, unreduced network performance data) measured over time intervals of a first time granularity to obtain second data (such as second, reduced statistical data that may include second, reduced network performance data) associated with time intervals of a second time granularity. This second data may be included in the network traffic analysis data provided to the management station 604 by the one or more network devices 602. The first time granularity may be finer than the second time granularity. The management station 604 may be configured to receive the second data from the one or more network devices 602, and to display the second data. The traffic analysis logic is configurable responsive to the management station 604 to reduce a volume of the first data to obtain the second data such that an indication of a feature (characteristic) of the first data is maintained in the second data, where the feature would be obscured if the second data were based on an aggregate of the first data over each of the time intervals of the second time granularity. An example of this data reduction is provided in FIGS. 4A through 4C, which are discussed below.

Figure 4A:
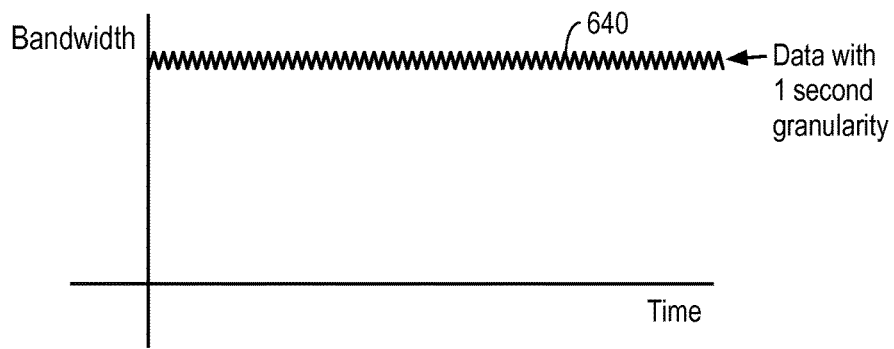
FIG. 4A illustrates an example of network performance data with one second granularity in which a feature of the data traversing the network device is obscured, in accordance with the prior art.

FIG. 4A illustrates an example of unreduced network performance data 640 with one second granularity in which a feature of the data traversing the network device 602 (see FIG. 2) is obscured, in accordance with the prior art. The unreduced network performance data 640 is shown as bandwidth (number of bits of data that can flow in a given time) of a data flow output by an Internet Protocol Television (IPTV) encoder measured as a function of time. For the one second granularity, notable features in the data (which are visible in FIG. 4B) are obscured because each data sample in the unreduced network performance data 640 may be based on an aggregate amount of data transmitted over a time interval significantly longer than the duration of each of the notable features in the data that are obscured.

Figure 4B:
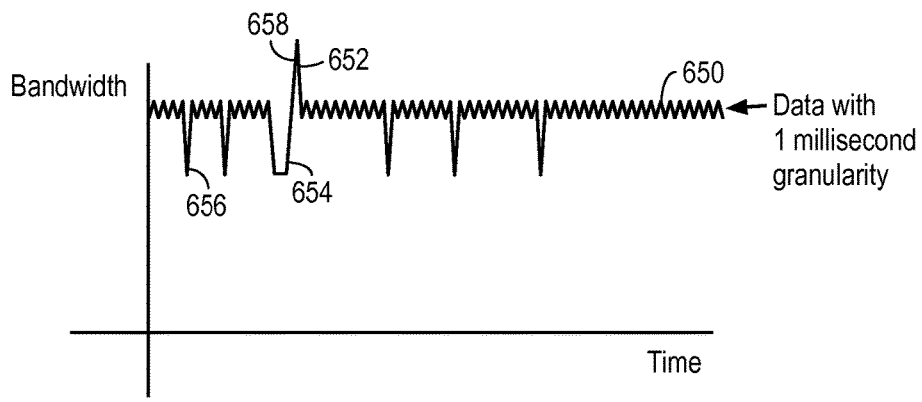
FIG. 4B illustrates an example of network performance data with one millisecond granularity in which a feature of data traversing a network device is maintained, in accordance with an embodiment of the invention.

FIG. 4B illustrates an example of unreduced network performance data 650 with one millisecond granularity in which a feature 658 of data traversing the network device 602 (see FIG. 2) is maintained, in accordance with an embodiment of the invention. The unreduced network performance data 650 is shown as bandwidth (number of bits of data that can flow in a given time) of a data flow output by an Internet Protocol Television (IPTV) encoder measured as a function of time. The unreduced network performance data 650 includes the feature 658, which may be indicated by a subset of the unreduced network performance data 650. The feature 658 may include a peak 652, during which bandwidth per millisecond of the unreduced network performance data 650 is substantially greater than an average bandwidth of the unreduced network performance data 650. The peak 652 is preceded by a valley 654, during which bandwidth per millisecond of the unreduced network performance data 650 is substantially less than an average bandwidth of the unreduced network performance data 650. The feature 658 may also include the valley 654. Alternatively, the feature 658 may include only the peak 652. There may be other dips 656 in the unreduced network performance data 650, but the time extent of the valley 654 may be significantly longer than the time extent of the other dips 656. The feature 658 may occur in the unreduced network performance data 650 due to, for example, an undesirable "hiccup" in the data flow output by the IPTV encoder, during which the IPTV encoder first fails to transmit data (during the valley 654), then bursts (during the peak 652) to maintain the average bandwidth of the unreduced network performance data 650. This phenomenon is an example of a microburst, which is a short period during which instantaneous traffic load on a communication channel is significantly higher and/or lower than a typical traffic load on the communication channel. The communication channel may be a physical channel (associated with a physical port) or a logical channel (associated with a logical port or flow) that may have a portion of data-carrying capacity of the physical channel. Microbursts in a network such as the network 100 (see FIG. 1) may be problematic because, for example, the peak 652 may violate capacity constraints in the network 100, leading to packet loss.

Figure 4C:
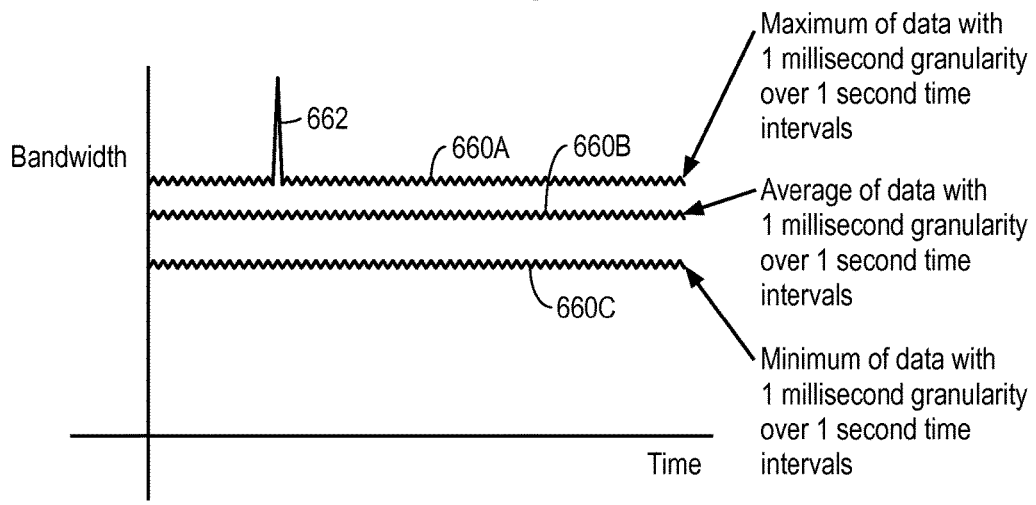
FIG. 4C illustrates an example of network traffic analysis data having reduced volume compared to the network performance data of FIG. 4B while maintaining an indication of the feature of the data traversing the network device, in accordance with an embodiment of the invention.

FIG. 4C illustrates an example of reduced network performance data 660 having reduced volume compared to the unreduced network performance data 650 of FIG. 4B while maintaining an indication of the feature 658 of the data traversing the network device 602 (see FIG. 2), in accordance with an embodiment of the invention. The reduced network performance data 660 is shown as bandwidth (number of bits of data that can flow in a given time) of a data flow output by an Internet Protocol Television (IPTV) encoder measured as a function of time. The reduced network performance data 660 has a one second granularity. The reduced network performance data 660 may be obtained by applying mathematical operations to the unreduced network performance data 650. In the example of FIG. 4C, the reduced network performance data 660A is the maximum, over 1 second time intervals, of the 1 millisecond granularity samples of the unreduced network performance data 650 within each of the 1 second time intervals. In one embodiment, an indication of variations included in the unreduced network performance data 650 over a 1 second time interval that are substantially greater than an average value of the unreduced network performance data 650 over the 1 second time interval are visible upon display of the reduced network performance data 660A. The reduced network performance data 660B is the average, over 1 second time intervals, of the 1 millisecond granularity samples of the unreduced network performance data 650 over each of the 1 second time intervals. The reduced network performance data 660C is the minimum, over 1 second time intervals, of the 1 millisecond granularity samples of the unreduced network performance data 650 over each of the 1 second time intervals. In one embodiment, an indication of variations included in the unreduced network performance data 650 over a 1 second time interval that are substantially less than an average value of the unreduced network performance data 650 over the 1 second time interval are visible upon display of the reduced network performance data 660C. As can be seen from the reduced network performance data 660A, an indication of the peak 652 (see FIG. 4B) in the unreduced network performance data 650 is maintained in the reduced network performance data 660A as peak 662, even though a volume of the reduced network performance data 660A may be at least 10 times less (in this case, 1000 times less) than a volume of the unreduced network performance data 650. For example, the indication 662 may include a maximum of the unreduced network performance data 650 over at least one of the 1 second time intervals. In this way, a volume of reduced network performance data at a granularity of 1 second may be significantly reduced from a volume of unreduced network performance data at a granularity of 1 millisecond, while maintaining an indication 662 of the peak 652 in the reduced network performance data.

In one embodiment, the reduced network performance data 660 may include a maximum and a minimum of the unreduced network performance data 650, such that indications of both a peak and a valley in the unreduced network performance data 650 are visible upon display of the reduced network performance data. The average value of the peak may be at least five times greater than an average of the unreduced network performance data 650 over a 1 second time interval (time granularity of the reduced network performance data 660) including the peak, and an average value of the valley may be at least five times less than an average of the unreduced network performance data 650 over a 1 second time interval (time granularity of the reduced network performance data 660) including the valley.

Referring to FIG. 2, in one embodiment, the traffic analysis logic may be configurable responsive to the management station 604 to vary a time granularity of reduced network performance data output from the traffic analysis logic. The traffic analysis logic may be configurable responsive to the management station 604 to include in the reduced network performance data at least one of a minimum, a maximum, and an average of the unreduced network performance data over time intervals of the time granularity of the reduced network performance data.

Figure 5:
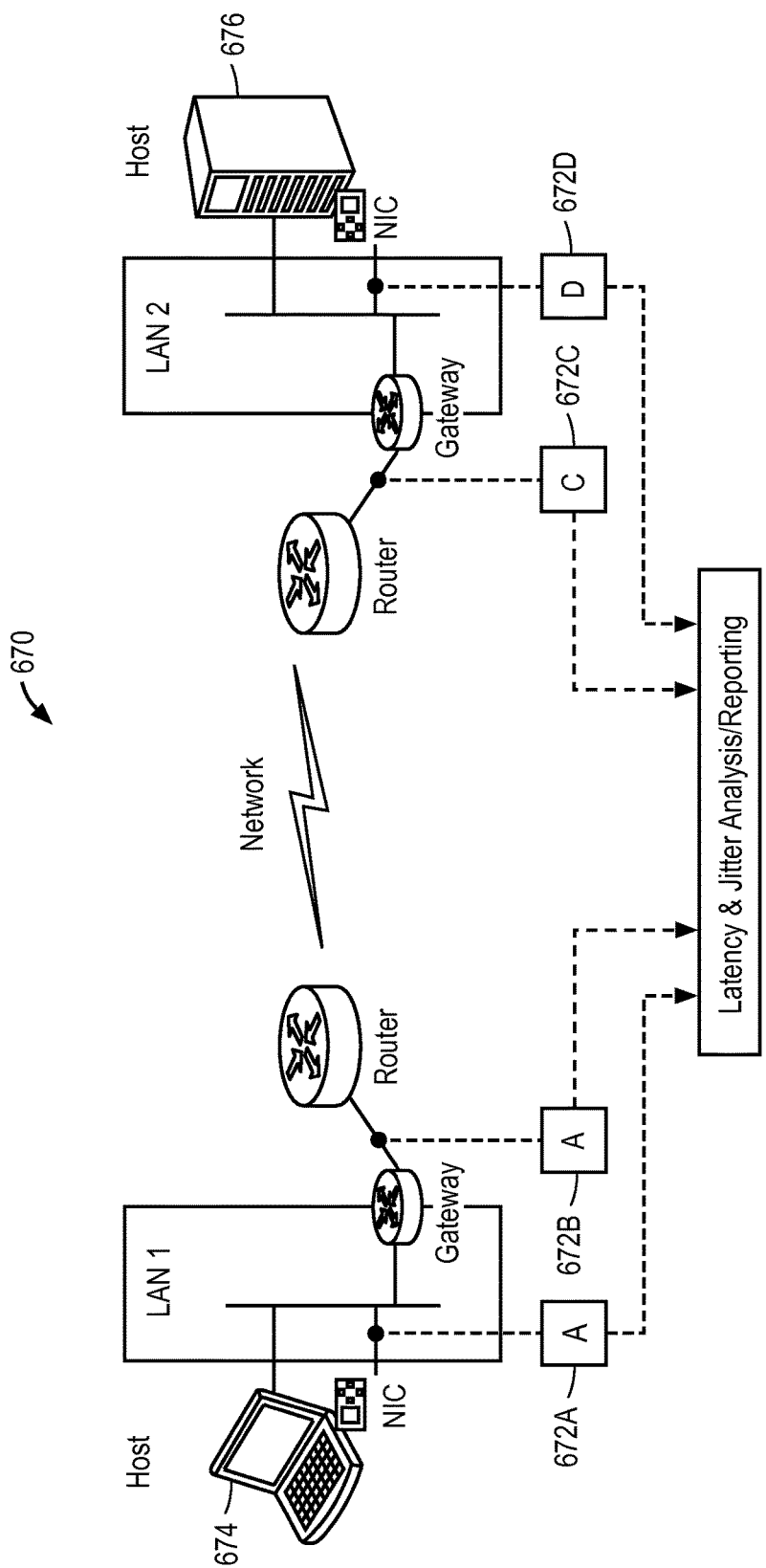
FIG. 5 illustrates an example of a network with representative locations at which timestamp values associated with data flows can be observed, in accordance with an embodiment of the invention.

FIG. 5 illustrates an example of a network 670 with representative locations 672A-672D at which timestamp values associated with data flows can be measured, in accordance with an embodiment of the invention. Referring to FIG. 2, the network device 602 may insert and/or remove a timestamp from one or more packets included in a data flow as part of measuring network latency for packets included in the data flow. Network latency of packets is packet delay introduced by a network. For example, network latency excludes delays due to software processing at a source (such as host 674) and a destination (such as host 676). Network latency can be measured either one-way (the time from the source sending a packet to the destination receiving it, such as from the location 672A to the location 672D), or round-trip (the sum of the one-way latency from the source to the destination plus the one-way latency from the destination back to the source, such as the sum of the one-way latency from the location 672A to the location 672D plus the one-way latency from the location 672D to the location 672A). Network latency may be the delay from the time of the start of packet transmission at a sender to the time of the end of packet reception at a receiver. Alternatively, network latency may be the delay from the time of the start of packet transmission at a sender to the time of the start of packet reception at a receiver.

Low network latency for data flows is important for various applications, such as algorithmic trading platforms. In algorithmic trading, excessive and/or unpredictable delays in executing trades reduce predictability of algorithms and potential for profit, and are therefore a disadvantage against competitors. It can be useful to measure one-way network latency and/or round-trip network latency. In asymmetric networks with different network latencies in each direction, measurements of one-way network latency can facilitate determination of the network latencies in each direction. Also, measurements of one-way network latency may be useful in networks in which transactions from the host 674 to the host 676 traverse a different path from transactions from the host 676 to the host 674. For example, in algorithmic trading, market data may be received by a broker's system via one communications path from an exchange, and orders may be sent to the exchange from the broker's system via a different communications path.

The network device 602 may insert and remove timestamps on-the-fly in hardware and/or reconfigurable logic, without capturing the data packets, and without copying the data packets. In this way, the timestamp insertion and removal may be performed with a high degree of accuracy as potentially unpredictable delays associated with software processing and with capturing and/or copying of the data packets are avoided. The network device 602 may also measure network latency for each packet in the data flow, may determine per-flow network latency (such as an average of per-packet network latencies for packets included in a data flow) and jitter (variation in the network latency), and may report per-flow network latency and jitter to the management station 604.

Figure 6:
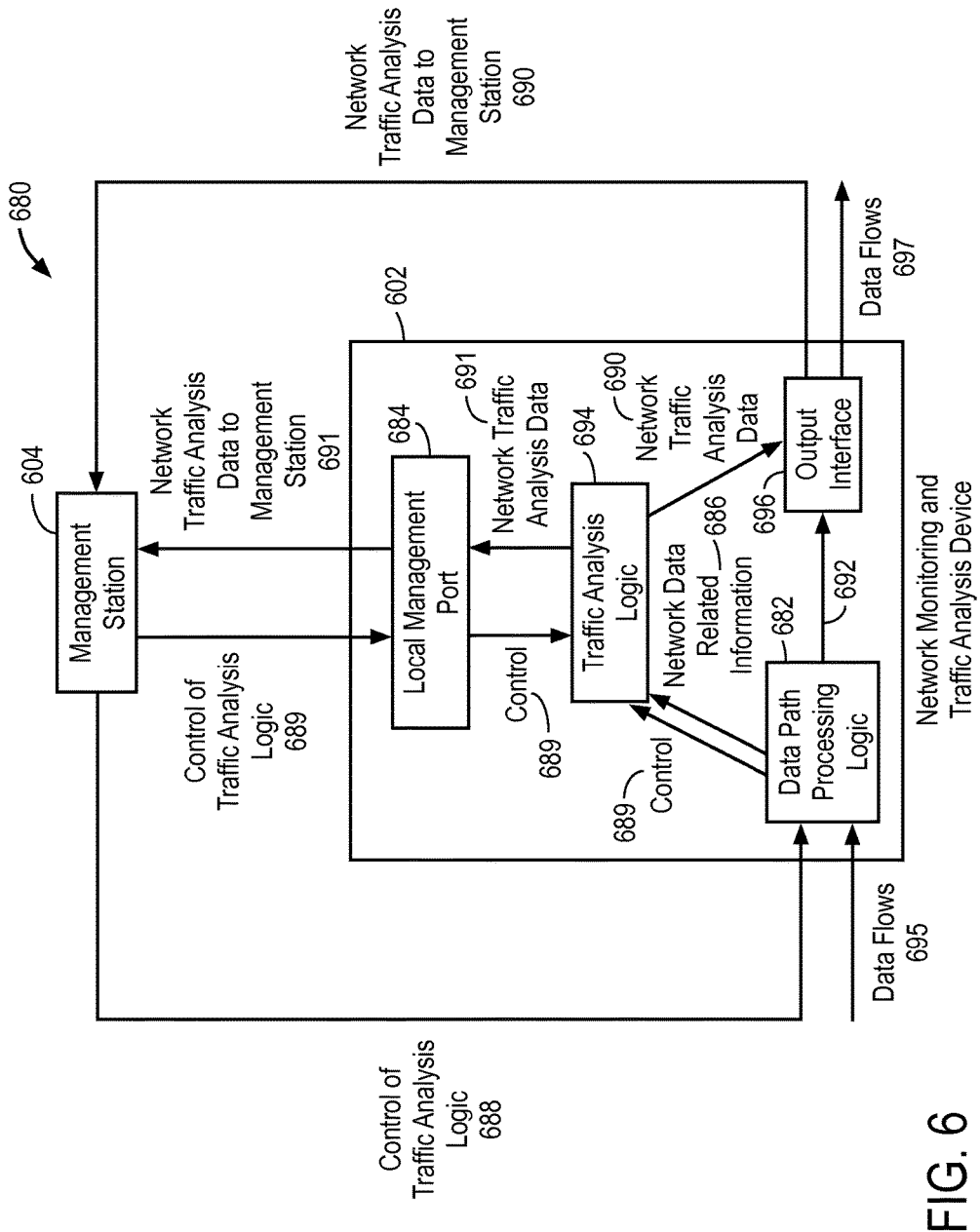
FIG. 6 illustrates a logical block diagram of a system for management of a network device, in accordance with an embodiment of the invention.

FIG. 6 illustrates a logical block diagram of a system for management of the network device 602, in accordance with an embodiment of the invention. The network device 602 includes data path processing logic 682 for monitoring data flows 695, an output interface 696, and traffic analysis logic 694. The data path processing logic 682 is configured to provide network data related information 686 to the traffic analysis logic 694, and network data directly to the output interface 696 along data path 692. Network data related information 686 may include, but is not limited to, data obtained from application of one or more rules to network data including data flows 695, statistics associated with the network data, time granularities over which the rule-based data and/or statistics are collected, and network latency measurement information associated with the network data, as described previously with reference to FIG. 2. The network device 602 may be configured to identify a subset of the data flows 695, and to collect the network data related information 686 from the identified subset of the data flows 695. The traffic analysis logic 694 processes the network data related information 686 to obtain network traffic analysis data, as described with reference to FIGS. 2, 4-5, and 7-8. The traffic analysis logic 694 may be configured by another device based on address information associated with the another device. The another device may be the management station 604. Alternatively, the another device may be another network device that interfaces to a management station. The traffic analysis logic 694 may generate one or more packets including the network traffic analysis data and the address information.

In one embodiment, the traffic analysis logic 694 may generate network traffic analysis data 690 in packet form, and may provide the network traffic analysis data 690 to the output interface 696. The traffic analysis logic 694 is operable to push the network traffic analysis data 690 to the another device (such as the management station 604) independently of a real-time request for at least a portion of the network traffic analysis data 690 from the another device. The real-time request may be a poll from the another device. As described previously with reference to FIG. 2, push-based management can significantly reduce network bandwidth overhead reduced with network management by removing overhead due to polling in pull-based management protocols such as the Simple Network Management Protocol (SNMP).

In this embodiment, push-based management can be performed independently of traditional network management protocols, as the traffic analysis logic 694 can augment the data flows 695 traversing the data path 692 with the network traffic analysis data 690. As described previously with reference to FIG. 2, typical SNMP stacks may not be designed for, and may not scale well to, increasingly fine-grain monitoring that may be needed for monitoring of packet flows. Also, the management station 604 may provide control information 688 to the traffic analysis logic 694 via the data path processing logic 682 without traversing a local management port 684. In this embodiment, the local management port 684, if included in the network device 602, may support configuration of portions of the network device 602 other than the traffic analysis logic 694.

The traffic analysis logic 694 may be configured to push the network traffic analysis data 690 to the another device based on a data transmission period. The traffic analysis logic 694 may be configured to collect the network data related information 686 based on a data collection period. The traffic analysis logic 694 may be configurable responsive to a subscription by the another device for the network traffic analysis data 690. The subscription may identify the data flows 695 based on identifiers, where each of the identifiers is associated with a corresponding one of the data flows 695. The traffic analysis logic 694 may be configurable responsive to the another device to advertise the data flows 695 to the another device.

In another embodiment, the traffic analysis logic 694 may provide network traffic analysis data 691 to a local management port 684. The local management port 684 may provide the network traffic analysis data 691 to the management station 604. The management station 604 may provide control information 689 to the traffic analysis logic 694 via the local management port 684, which may be configured to support configuration of the traffic analysis logic 694.

Figure 7:
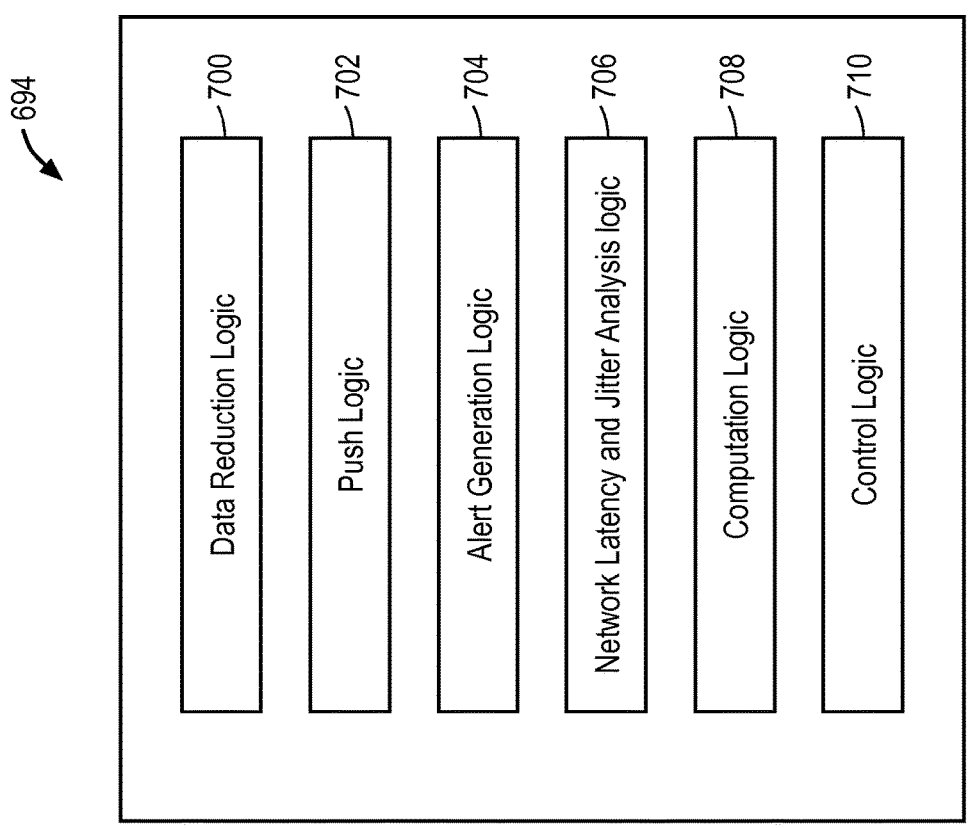
FIG. 7 illustrates a logical block diagram of traffic analysis logic included in the network device, in accordance with an embodiment of the invention.

FIG. 7 illustrates a logical block diagram of the traffic analysis logic 694 included in the network device 602 (see FIG. 6), in accordance with an embodiment of the invention. The traffic analysis logic 694 may include one or more of data reduction logic 700, push logic 702, alert generation logic 704, network latency and jitter analysis logic 706, computation logic 708, and control logic 710.

The data reduction logic 700 may be configured to perform functions of the traffic analysis logic 694 associated with data reduction. For example, the data reduction logic may be configured to process first data (such as first, unreduced statistical data that may include first, unreduced network performance data) measured over time intervals of a first time granularity to obtain second data (such as second, reduced statistical data that may include second, reduced network performance data) associated with time intervals of a second time granularity. The first time granularity may be finer than the second time granularity. The unreduced statistical data may be measured by at least one of a plurality of microcode controlled state machines (see below with reference to FIG. 8), and may be measured based on network data included in each of a plurality of data flows 695 traversing the at least one of the plurality of microcode controlled state machines. The volume of the reduced statistical data may be reduced from the volume of the unreduced statistical data, such as by at least ten times. The volume reduction may be based on performance of a mathematical operation on the unreduced statistical data, such as at least one of a minimum, a maximum, an average, a convolution, a moving average, a sum of squares, a linear filtering operation, and a nonlinear filtering operation. The data reduction logic 700 may be configurable to reduce a volume of the unreduced statistical data to obtain the reduced statistical data such that an indication of a feature (characteristic) of the unreduced statistical data is maintained in the reduced statistical data, where the feature would be obscured if the reduced statistical data were based on an aggregate of the unreduced statistical data over each of the time intervals of the second time granularity. The reduced statistical data may have other attributes of the reduced network performance data 660 described with reference to FIGS. 4A through 4C.

The push logic 702 may be configured to perform functions of the traffic analysis logic 694 associated with push-based management, as described with reference to FIG. 6. For example, the push logic 702 may be configured to push the reduced statistical data across a network independent of a real-time request from the network. The push logic 702 may be configurable to generate one or more packets including the reduced statistical data and address information associated with a device located elsewhere in the network. The push logic 702 may be configurable to advertise the plurality of data flows to a device located elsewhere in the network. Referring to FIG. 6, the push logic 702 may be operable to push the reduced statistical data through communications traversing at least a portion of the data path 692.

The alert generation logic 704 may be configured to perform functions of the network device 602 (see FIG. 2) associated with generation of alert indications, as described with reference to FIG. 2. The alert generation logic 704 may be configured to generate an alert indication associated with at least one of the plurality of data flows 695 (see FIG. 8) by processing statistical data to determine whether the statistical data implicates a characteristic associated with the alert. The characteristic may take various forms known to one of ordinary skill in the art as relating to network data. For example, the characteristic may be indicated based on occurrence of a bit pattern in the network data and/or based on an occurrence of a pattern of variation in a data rate associated with the network data. Alternatively or in addition, the characteristic may take various forms known to one of ordinary skill in the art as relating to operability of network devices. For example, the operational characteristic may be indicated based on existence of an alarm condition of a particular degree of severity, or may be based on configuration information, such as configuration of hardware, software, and/or customer services. The statistical data may be measured by at least one of a plurality of microcode controlled state machines (see below with reference to FIG. 8), and may be measured based on network data included in each of a plurality of data flows 695 traversing the at least one of the plurality of microcode controlled state machines.

In one embodiment, the alert generation logic 704 may be configured to determine whether the statistical data implicates the characteristic associated with the alert based on performance of a mathematical operation on the statistical data. The mathematical operation may include at least one of a minimum, a maximum, an average, a convolution, a moving average, a sum of squares, a linear filtering operation, and a nonlinear filtering operation. The alert generation logic 704 may be configured to apply the mathematical operation to the statistical data over multiple time intervals, such that the characteristic associated with the alert is implicated if the maximum of the statistical data over at least one of the plurality of time intervals is substantially greater than an average value of the statistical data over the at least one of the multiple time intervals.

The network latency and jitter analysis logic 706 may be configured to perform analysis on measured per-packet network latency data to obtain per-flow network latency and jitter information. For example, the network latency and jitter analysis logic 706 may perform a mathematical operation on the per-packet network latency data to obtain the per-flow network latency and jitter information. The mathematical operation may include at least one of a minimum, a maximum, an average, a convolution, a moving average, a sum of squares, a linear filtering operation, and a nonlinear filtering operation.

The computation logic 708 may be configured to perform mathematical operations to support the data reduction logic 700, the alert generation logic 704, and the network latency and jitter analysis logic 706. The mathematical operation may include at least one of a minimum, a maximum, an average, a convolution, a moving average, a sum of squares, a linear filtering operation, and a nonlinear filtering operation.

The control logic 710 may be configured to process control information received from the network (such as a management station 604; see FIG. 6) and to convert the control information into signals for configuring one or more of the data reduction logic 700, the push logic 702, the alert generation logic 704, the network latency and jitter analysis logic 706, and the computation logic 708.

Figure 8:
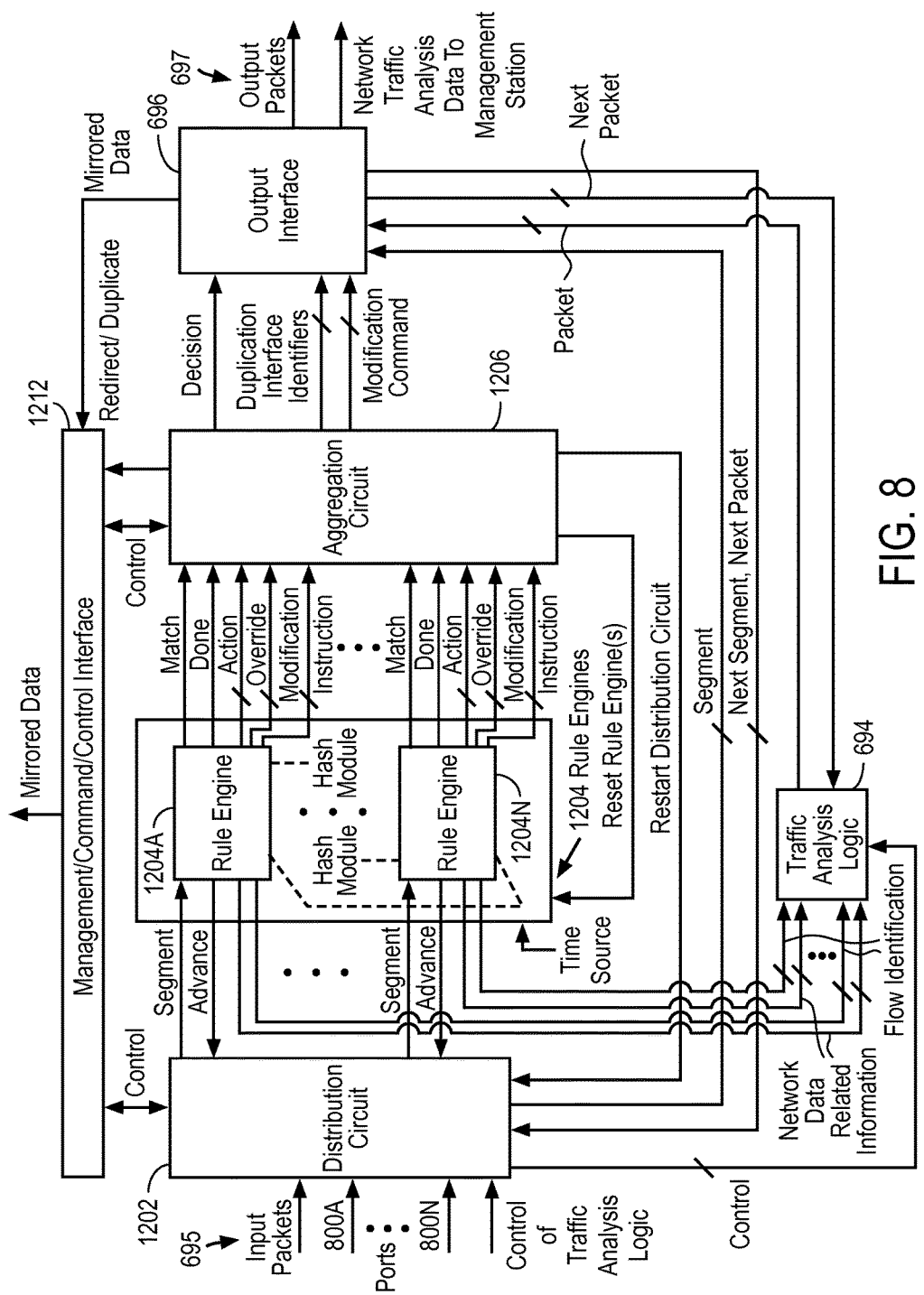
FIG. 8 illustrates a logical block diagram of an architecture of an embodiment of the invention.

FIG. 8 illustrates a logical block diagram of the architecture of an embodiment of the invention. This architecture may be used in the network device 602 (see FIGS. 2 and 6). The network device 602 can be deployed as a "bump in the wire" with three (or more) interfaces. In one embodiment, there is one interface for input network traffic 695, a second interface for output network traffic 697, and a third interface 1212 for output network traffic that has been duplicated or re-directed, or for management communications. Input packets 695 from the network 110 first enter a distribution circuit 1202. In the illustrated embodiment, the distribution circuit 1202 divides the input packets 695 into traffic segments. In another embodiment, the input packets 695 are divided into segments by a pre-processor that may precede the distribution circuit. This pre-processor, which may be a custom or standard protocol core, can also provide packet fragmentation/re-assembly and/or packet re-ordering functionality. A traffic segment is typically a fixed-length sequence of bytes derived from a single input packet, in the same order as the bytes that entered the distribution circuit 1202. A traffic segment is not to be confused with a Transmission Control Protocol (TCP) segment, which could include multiple packets. If a packet does not have enough bytes remaining to fill a traffic segment, the remaining bytes of the traffic segment are unused. Each byte of a traffic segment may be associated with a control bit that serves as a validity indicator, with unused bytes marked as invalid.

In the embodiment illustrated in FIG. 8, each traffic segment is routed in parallel for processing by each rule engine of a set of rule engines 1204A-1204N, hereinafter referred to as 1204. The distribution circuit 1202 also holds each of the input packets 695 until an output interface 696 indicates to the distribution circuit 1202 whether the packet should be forwarded or deleted, for example by skipping. These segments are of a width in bytes equal to the bus width for segments between the distribution circuit 1202 and each rule engine 1204, and between the distribution circuit 1202 and the output interface 696.

Each rule engine 1204 asserts an advance indication to the distribution circuit 1202 when it is ready for additional traffic segments from the distribution circuit 1202. When all rule engines 1204 have asserted their advance lines, the distribution circuit 1202 sends the next traffic segment to all rule engines 1204. Each of the individual rule engines 1204 executes a configured rule. In one embodiment, each rule engine 1204 evaluates to a value of true or false and asserts a done line at the end of each packet.

After a rule engine 1204 has completed evaluation of a rule, it notifies the aggregation circuit 1206 of the result. If the rule evaluates to true, the match line to the aggregation circuit 1206 is asserted. When evaluation of a rule is completed for a data portion, which can be the set of traffic segments obtained from the division of one or more input packets 695, the done line is asserted. The action lines indicate to the aggregation circuit 1206 whether to redirect or to duplicate the data segment, and allow future scalability to additional interfaces for duplication or redirect. When the output of a rule engine 1204A is to override the outputs of a subset of rule engines 1204B-1204N, the rule engine 1204A may assert override lines corresponding to that subset of rule engines 1204B-1204N. In another embodiment, the rule engine 1204A may assert one override line that overrides rule engines 1204B-1204N.

The aggregation circuit 1206 includes output logic that enforces policies, which are sets of rules and the logical, causal, and/or temporal relationship between them. The aggregation circuit 1206 waits until all rule engines 1204 assert their corresponding done bits before making a decision based on the outputs of all rule engines 1204. The decision, typically to drop, forward or duplicate the packet, is passed to the output interface 696, along with a duplication interface identifier. The duplication interface identifier indicates to the output interface 696 if the packet is being duplicated. The aggregation circuit 1206 asserts a restart to the distribution circuit 1202 when the aggregation circuit 1206 determines that the distribution circuit 1202 can skip all remaining segments of the current packet and go directly to processing of the next packet. It can be desirable for the aggregation circuit 1206 to also support duplication or re-direction of traffic to the management interface 1212.

When a packet is to be forwarded, the output interface 696 requests via the next packet line that the next packet be sent to it from the distribution circuit 1202. During the transfer of the next packet, the output interface 696 asserts a next segment indication to the distribution circuit 1202 when it is ready for one or more additional traffic segments from the distribution circuit 1202. In one embodiment, when the output interface 696 receives traffic segments from the distribution circuit 1202, the output interface 696 may buffer some or all of the packet, as necessary, before transmitting it as an output packet 697. This depends on the post-processing functions that it may need to perform, which may include, but are not restricted to, encryption. In another embodiment, segments of the packet may be sent out as they are received by output interface 696. In that mode of operation, if the decision of the aggregation circuit 1206 is to drop the packet, then the packet is truncated and becomes practically unusable by connected equipment receiving the packet.

For packet and stream processing, there need not be involvement of any general purpose central processing unit (CPU). There is a general management/command/control interface available for external equipment, typically containing a CPU, to control the distribution circuit 1202, the aggregation circuit 1206, and all rule engines 1204 via control of the aggregation circuit 1206.

An embodiment of a rule engine 1204 is a microcode controlled state machine that executes a configured behavioral or signature-based rule. A rule is compiled to a set of bits, or microcode, that is used to program the microcode controlled state machine and associated configuration registers. Each microcode controlled state machine includes a computation kernel operating in accordance with microcode stored in an associated control store. The microcode controlled state machines configure an optimized data path to perform such operations as equality, masked equality, and range inclusion/exclusion operations on each traffic segment. The data path comprises shallow stages whose implementation requires only a few logic levels, thus enabling a very high frequency design.

The set of rule engines 1204 can be implemented as a pipelined fabric of microcode controlled state machines that operate concurrently and collaboratively on each traffic segment. This regular structure lends itself to creation of high capacity, parallel designs through replication of a small number of fundamental building blocks. It also provides an ability to preserve state information, such as TCP connection information, locally in the relevant microcode controlled state machine as part of its state. In contrast to the typical approach in firewalls of preserving state information of all connections in shared memory, this fabric also allows for state information to be stored as a local state of a single microcode controlled state machine. However, the architecture also supports a global state table (that may contain connection information) that is globally available to all rule engines 1204. The global state table may be maintained in a CAM or an external memory, and may be implemented as on-chip memory. If in a CAM or an external memory, the global state table may be accessed by the rule engines 1204 via the management interface 1212, which is responsible for a controller that maintains the state information and presents relevant state information pertaining to the current packet to all the rule engines. The, information in the global state table may be simultaneously accessed by the rule engines 1204, such as via hardware signal lines to each rule engine 1204. In this embodiment, no clock cycles are wasted managing queues of requests for lookups to a CAM or an external memory. The global state table may be updated on a per packet basis by dedicated hardware. This architecture, along with its associated instruction set, can also be customized and optimized. This allows for efficient, easily configurable, and unified header processing and deep inspection of packet payloads.

The aggregation circuit 1206 includes output logic that enforces policies. A policy may be a simple collection of rules related using Boolean logic. In one embodiment, the aggregation circuit 1206 aggregates the outputs of individual blocks, for example expressed as a Boolean OR of several rules. If any of these multiple rules are true, then a configured action is taken, such as dropping the packet. The aggregation policy can be implemented as a tree, where each tree node can be configured to function as a logical OR or AND. A policy can be configured to be a complicated composite relationship between rules, such as a sum of products, and/or a causal or temporal relationship. The aggregation logic can implement any combinatorial or sequential logic.

In one embodiment, the aggregation circuit 1206 generates control signals to activate and deactivate a subset of one or more of the set of rule engines 1204. The aggregation logic can also reset or provide rule feedback to the subset of rule engines 1204, and can set parameters used by the distribution circuit 1202. A rule engine 1204 can include logic and can generate control signals to directly activate and deactivate one or more other rule engines.

Referring to FIGS. 6 and 8, the data path processing logic 682 may include the distribution circuit 1202, the one or more microcode controlled state machines 1204, and the aggregation circuit 1206. The data path 692 may include at least the distribution circuit 1202, the output interface 696, and connections to the distribution circuit 1202 and the output interface 696 traversed by data packets included in one or more of the data flows 695 traversing the network device 602.

FIG. 8 illustrates an example of a parametric architecture, which enables scaling of key performance metrics, such as throughput, with design parameters, such as traffic segment width, without changing the fundamental structure of the architecture. Wider traffic segments, which correspond to a wider data path, can be used to increase overall system throughput by pushing more bits per hardware clock cycle through the apparatus. It is possible to tune the data path width and to make a trade-off between the use of silicon resources (gates) and the operating frequency of the apparatus. The worst-case throughput through the apparatus can be accurately calculated by multiplying the traffic segment width by the number of clock cycles per second divided by the worst-case number of clock cycles per traffic segment. For typical applications, the worst-case number of clock cycles per traffic segment is less than five, preferably two. The worst-case latency can be accurately calculated depending on whether the forwarding policy is store and forward, or cut-through. For store and forward, the worst case latency is directly proportional to the quotient of the number of segments in two maximum size packets divided by the clock frequency. The processing time is linear in the number of traffic segments in a packet.

The architecture illustrated in FIG. 8 is designed to be optimal, specifically, for network monitoring, traffic analysis, and security applications. However, this architecture is also general enough to implement general purpose pattern matching, including packet classification, deep inspection, and on-the-fly database applications. The common denominator is the concept of processing data one segment at a time, where the size of a segment is a design parameter of a parametric architecture.

Rules used by rule engines 1204 can be specified in several ways, including but not limited to bit configuration of the hardware, use of low level assembler, translation from existing languages used by common intrusion detection systems (IDS) and firewalls, or use of a high level language. In one embodiment, low level assembler is used, based on a unique and proprietary instruction set architecture (ISA) corresponding to an underlying hardware architecture optimized for network security applications. In another embodiment, a high level, tailored rule definition language is used, based on a proprietary high level language for the Stream and Packet Inspection Front End (SPIFE). Some examples of rules in a high level rule definition language include:

drop inbound eth:ip:tcp ip.src=1.2.3.4, tcp.dport=80;
Meaning: drop TCP packets that are coming inbound (from the external network toward the protected segment), which have an IP source address of 1.2.3.4 and a destination port 80 (http).

drop inbound eth:ip:udp payload: "malicious";
Meaning: drop User Datagram Protocol (UDP) packets that are coming inbound (from the external network toward the protected segment) if their payload contains the keyword "malicious".

drop inbound eth:ip:udp payload: "malic*ious" [ignore-case];

Meaning: drop User Datagram Protocol (UDP) packets that are coming inbound (from the external network toward the protected segment) if their payload includes the keyword "malicious" where any number of characters separates the "c" from the "i". The payload is case-insensitive, such that, for example, "Malicious", "mAliCious", and "MALICIOUS" are dropped.

count all inbound eth:ip:icmp icmp.type=PING_REPLY;
Meaning: count Internet Control Message Protocol (ICMP) ping-reply packets sent via the IP and Ethernet protocol layers.

duplicate all inbound eth:ip:icmp icmp.type=PING_REPLY;
Meaning: duplicate inbound ICMP ping-reply packets sent via the IP and Ethernet protocol layers to the third interface without interfering with the normal packet flow from the first interface to the second interface, or from the second interface to the first interface.

redirect all inbound eth:ip:icmp icmp.type=PING_REPLY;
Meaning: redirect inbound ICMP ping-reply packets sent via the IP and Ethernet protocol layers to the third interface.

Figure 9:
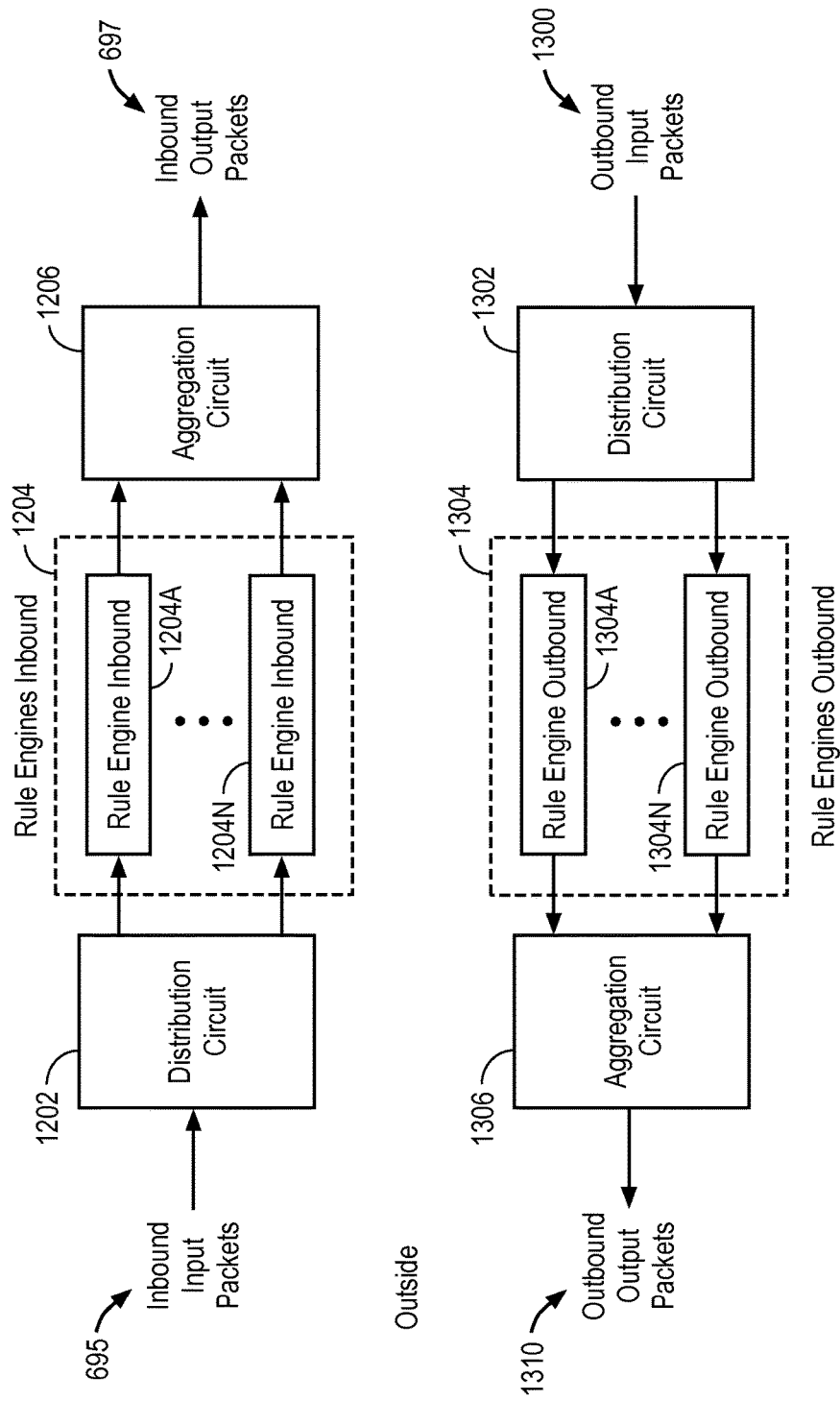
FIG. 9 illustrates the use of the architecture of FIG. 8 for bidirectional applications, in accordance with an embodiment of the invention.

FIG. 9 illustrates the use of the architecture of FIG. 8 for bidirectional applications, in accordance with an embodiment of the invention. One example is client-server applications, for which it is desirable to monitor bidirectional protocol behaviors or event triggering. If the server is outside the portion of the network protected by the apparatus and the client is inside that portion of the network, traffic from the server is inbound, and requests and responses from the client are outbound. Inbound input packets 695 are processed by the distribution circuit 1202, the set of rule engines 1204, and the aggregation circuit 1206 to obtain inbound output packets 697. The output interface 696 is not shown in FIG. 9 for simplicity. Outbound input packets 1300 are processed by distribution circuit 1302, a set of rule engines 1304, and aggregation circuit 1306 to obtain outbound output packets 1310. The distribution circuit 1202, the set of rule engines 1204, and the aggregation circuit 1206 form a first path in the inbound, or first, direction, and can be aligned with the distinct distribution circuit 1302, the set of rule engines 1304, and the aggregation circuit 1306 that form a second path in an outbound, or second, direction different from, such as opposite to, the first direction. Alignment in this context is conceptual, and does not imply any restrictions on the physical positioning of these blocks relative to each other in an implementation. To handle bidirectional applications, it can be desirable for the set of rule engines 1204 to exchange control information with the set of rule engines 1304. In another embodiment, each rule engine 1204 could dynamically alternate between processing traffic from the first path and the second path. This dynamic alteration may be controlled by microcode, and may also be controlled by the configuration bits of the rule engine 1204. The rule engines 1204 may alternate between processing traffic from the first path and the second path independently and/or as a group.

Figure 10:
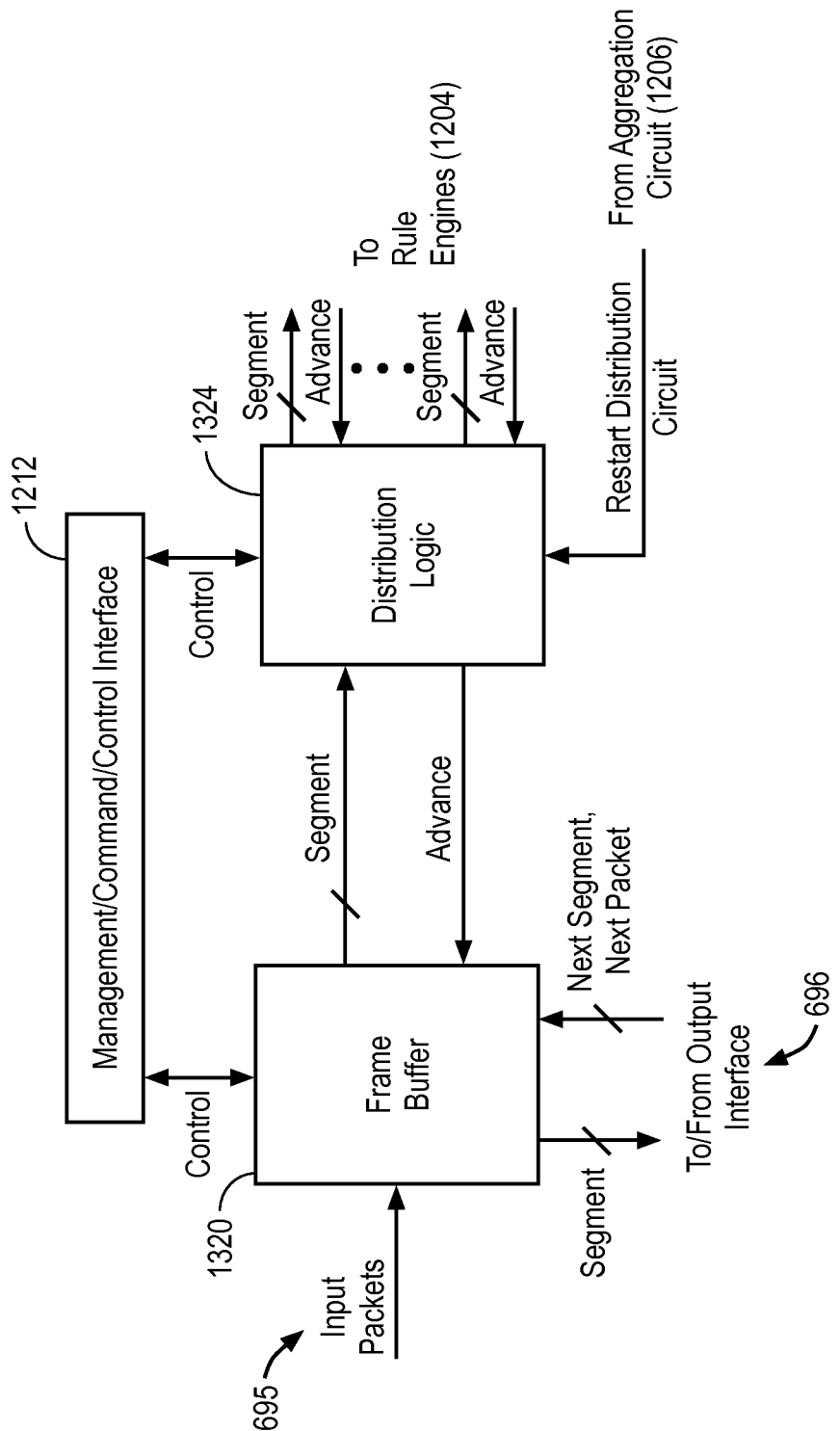
FIG. 10 illustrates the internal architecture of the distribution circuit shown in FIG. 8, in accordance with an embodiment of the invention.

FIG. 10 illustrates one embodiment of the internal architecture of the distribution circuit 1202 shown in FIG. 8, in accordance with an embodiment of the invention. The input packets 695 enter a frame buffer 1320. In this embodiment, the buffer 1320 is a FIFO buffer, and is logically organized in segment sizes equal to the width of the data path through the apparatus. The input packets 695 may have already been partitioned into traffic segments by a pre-processor, in which case the frame buffer 1320 may not be required. Otherwise, the input packets 695 are placed into the frame buffer 1320 with a separator between the input packets 695. The frame buffer 1320 logically has one write port, for the input packets, and two read ports, one for a distribution logic block 1324 and the other for the output interface 696. A standard implementation of such a buffer uses two separate memory blocks, such that one is near the input interface and one is near the output interface. In a store-and-forward implementation, a packet remains stored in the frame buffer 1320 until a decision by the rule engines 1204 has been communicated by the aggregation circuit 1206 to the output interface 696, causing the output interface 696 to assert the next packet line. In a cut-through implementation, each traffic segment of a packet is forwarded without delay to the output interface 696. A kill signal may be sent to the output interface 696 to cause the output interface 696 to corrupt a portion of the packet in order to cause the packet to be discarded by the devices on the receiving end in the network. Both the frame buffer 1320 and the distribution logic 1324 can have management/command/control interfaces.

The distribution logic 1324 grabs a data segment out of the frame buffer 1320 when all of the connected rule engines 1204 are ready for the next segment of data, as indicated by their de-assertion of their advance control lines to the distribution logic 1324. If one or more of the rule engines 1204 is not ready, the distribution logic 1324 de-asserts the advance control line to the frame buffer 1320 and waits until all of the rule engines 1204 are ready. The distribution logic 1324 receives the restart from the aggregation circuit 1206, described with reference to FIG. 8, that causes the distribution logic 1324 to skip all remaining segments of the current packet and go directly to processing of the next packet.

Figure 11:
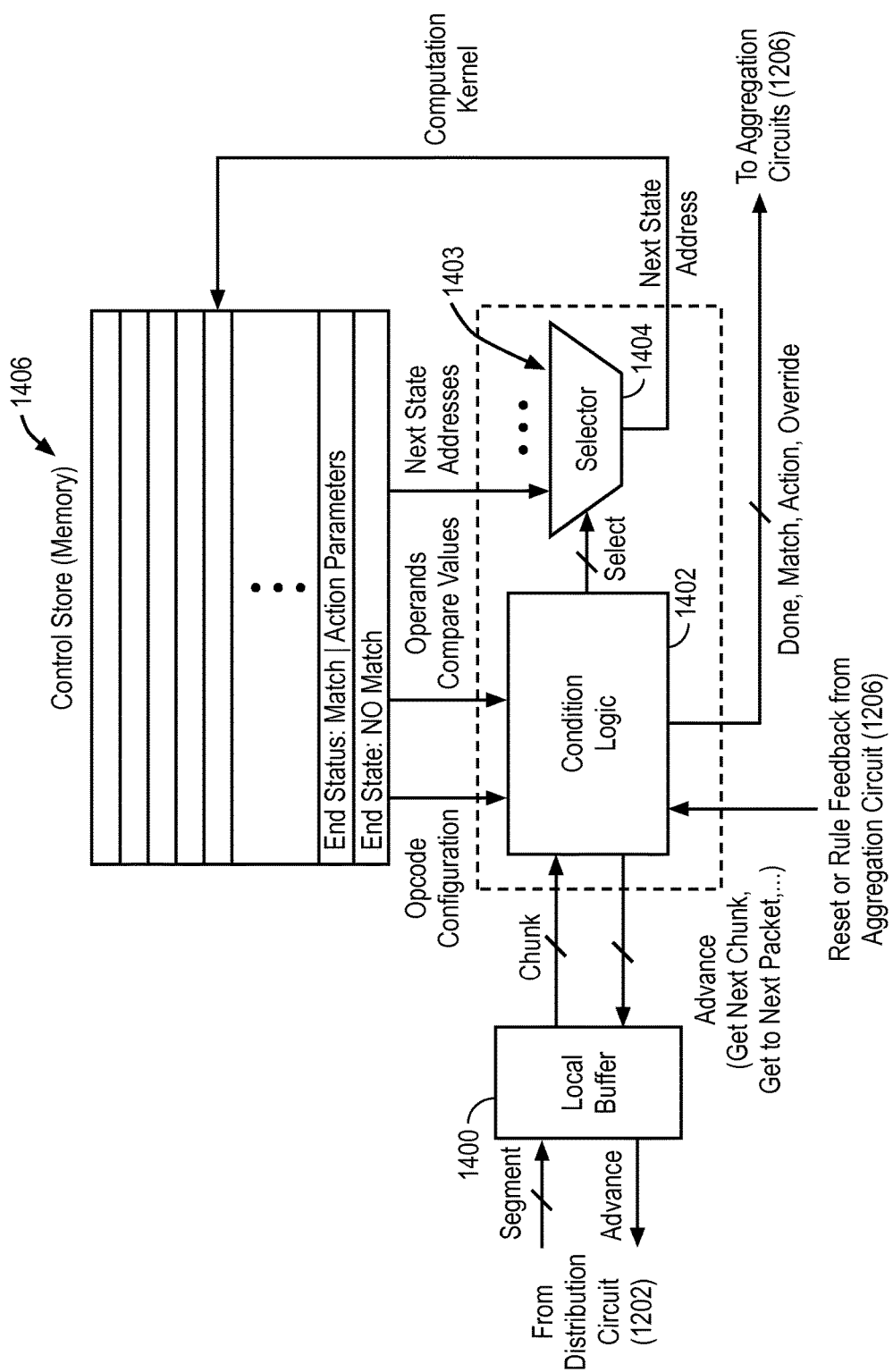
FIG. 11 illustrates the internal architecture of the rule engine shown in FIG. 8, based on a microcode controlled state machine, in accordance with an embodiment of the invention.

FIG. 11 illustrates the internal design of a rule engine 1204 based on a microcode controlled state machine configured in accordance with an embodiment of the invention. The design is based on a custom programmable state machine with independent local memory. The memory is typically static random access memory (SRAM), but can be of a different type. Programming the state machine is done by writing content to a control store memory 1406. The functionality of the rule engine 1204 is changed by writing new microcode to the control store 1406. Bus implementations to enable reading from and writing to distributed local memory are well known in the art. It is also contemplated that the rule engine 1204 can be implemented in various ways, such as using application specific integrated circuits (ASICs) or programmable logic devices (PLDs).

Each rule engine 1204 may contain a small first-in first-out (FIFO) local buffer 1400 to hold traffic segments received from the distribution circuit 1202 while each rule engine 1204 is processing a preceding segment. If present, this buffer indicates to the distribution logic via the advance line when it is able to accept additional segments.

The purpose of the local buffer is to prevent periods of time during which no data is available for processing by a rule engine 1204 (stalls). The local buffer can be thought of as a fixed length window that slides over the input data. A traffic segment is provided to each rule engine 1204 by the distribution circuit 1202 when all rule engines 1204 have asserted their advance lines, which indicates that the local buffers of all rule engines 1204 have space for the traffic segment. Traffic segments already in the local buffers of rule engines 1204 are available for processing in parallel by all rule engines 1204. As a result, a rule engine 1204 that has completed processing of a first traffic segment can immediately pull the next traffic segment from the local buffer, without being stalled by another rule engine 1204 that has not yet completed processing of the first segment. Since there is a maximum number of comparisons, and thus processing cycles, required to apply a rule to a traffic segment, the size of this local buffer can be bounded. Typically, processing of a traffic segment by a rule engine 1204 requires no more than two cycles. If two cycles is then set as the number of processing cycles for any traffic segment, sliding the window every two cycles by the number of bytes required to include the next traffic segment guarantees that none of the local buffers become full.

A condition logic block 1402 indicates via an advance line when it is ready to receive the next segment of data from the input buffer 1400 or directly from the distribution circuit 1202. The condition logic 1402 is configured by each line of microcode to perform one or more comparisons on the current segment and, based on the comparisons, to select the next state using a selector 1404. The condition logic 1402 and the selector 1404 are included within a computation kernel 1403. The condition logic 1402 implements combinatorial operations as well as sequential logic, which depends on its internal state. In this embodiment, the next state is the address of the next microcode instruction to execute. In addition, the condition logic 1402 sets the done, match, action, and override indications provided to the aggregation circuit 1206. The aggregation logic can generate control signals to activate and deactivate the condition logic 1402, or to provide rule feedback to the condition logic 1402.

Each microcode line in the control store 1406 determines what kind of comparisons to perform on the current traffic segment. Based on the comparison results, the microcode line also provides the address of the next microcode line to execute. In one embodiment, each line in the control store 1406 includes four types of information:

1. Control bits (such as opcodes or configuration bits) that determine what type of comparisons are performed by the condition logic 1402, and what internal state should be stored in internal state variables (flops and registers).
2. Values used by the comparisons. Comparison types include equality, membership in a set, range comparison, and more complex operations, such as counter comparisons that indicate whether a bit sequence has occurred more than 3 times in the previous 10 segments.
3. Addresses of subsequent addresses to execute based on the output of the condition logic 1402. Depending on the result of the condition logic 1402, one of multiple next addresses may be selected. Allowing more than one next address allows greater flexibility for implementing complex conditions, while saving clock cycles.
4. Control of internal state and primary outputs of the rule engine 1204. For example, this can include whether to assert the done line, whether to advance to the next segment in the packet or to stay for another comparison involving the current segment, or whether to move immediately to the end of the current packet.

These different types of comparisons, along with the architecture, enable processing of both individual packets and streams of packets by the set of rule engines 1204. A rule engine 1204 can process a stream without actually fully reconstructing it in external system memory. Based on the microcode instructions, the rule engine 1204 can make decisions that are based on a sequence of events that happen over time and are encapsulated in separate packets.

FIG. 12 shows an example of an execution sequence of microcode instructions to implement a comparison rule, in accordance with an embodiment of the invention. The sequence of searches for a four-byte sequence "abcd" in two successive segments (each assumed to be 2 bytes), followed by a two-byte sequence with a value between "10" and "14" inclusive. For a twenty byte packet that is represented symbolically as "1234yzwxabcd12345678", the actual state transitions from the start of the packet until a decision is 0→1→1→1→1→1→2→3→4. When the rule engine 1204 reaches state 4, it asserts both the done and match outputs to the aggregation circuit 1206 in FIG. 8. If the packet data does not include the desired content, then as soon as the SEGMENT equals the two-byte packet separator "- -", there is an automatic transition to state 5. In state 5, the rule engine 1204 asserts the done line and deasserts the match line.

The number of operations that can be executed in parallel on SEGMENT and their type depends on the specific hardware implementation, including the control store memory line width. This example assumes that the comparison of SEGMENT against a given value and the check of whether SEGMENT is within a given range can be done in parallel. Otherwise, the operations can be done in two separate consecutive clock cycles. For example, state 3 makes two checks in parallel and assumes that the three next address values can be specified in one control store memory line.

Figure 13:
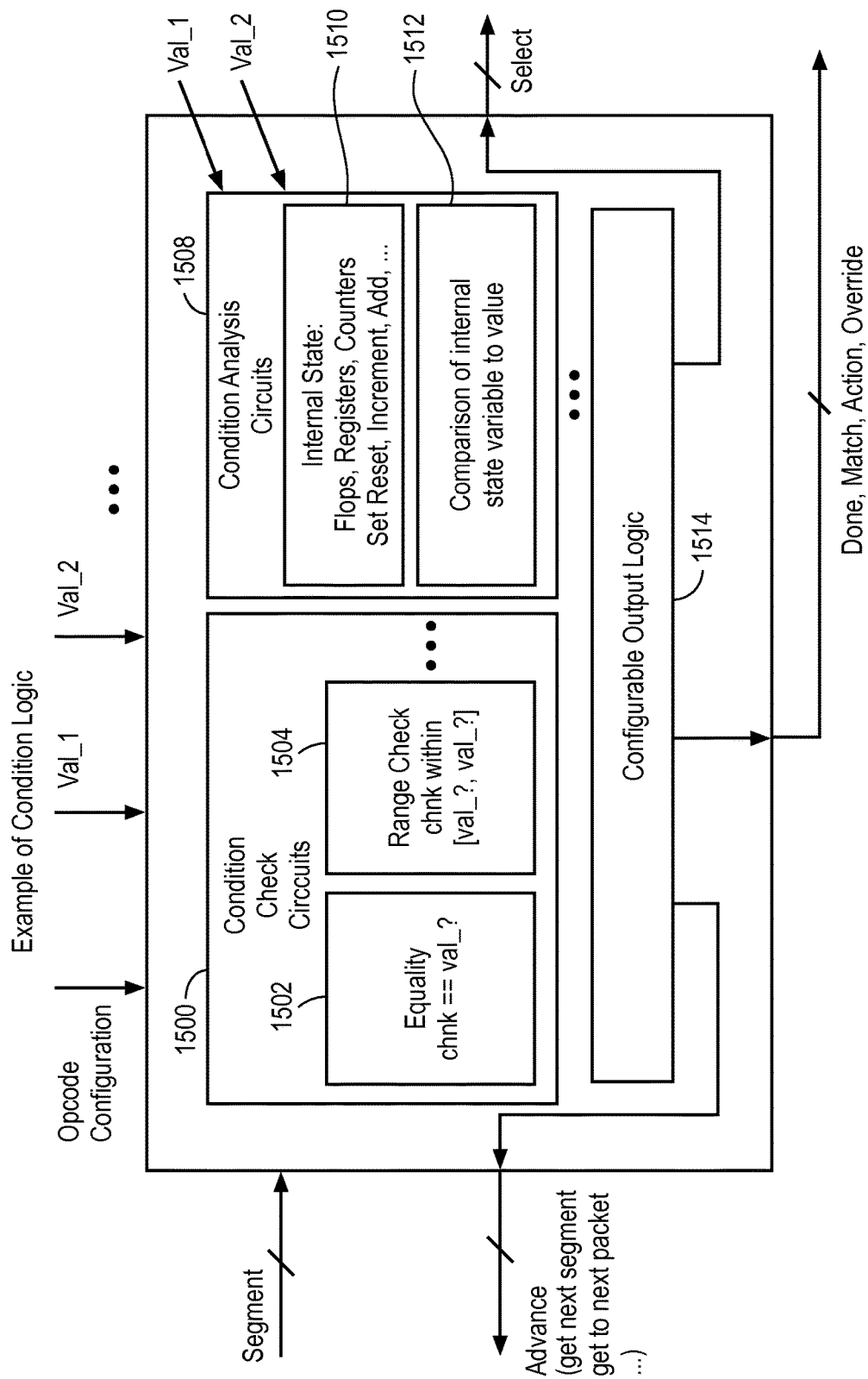
FIG. 13 illustrates an example of the internal architecture of the condition logic shown in FIG. 11, in accordance with an embodiment of the invention.

FIG. 13 illustrates an example of the implementation of condition logic in FIG. 11, in accordance with an embodiment of the invention. Based on the segment input from the local buffer 1400 and the opcode and configuration bits from the control store 1406, a set of comparisons can be done in parallel between the segment, operands, and internal state variables. An operand is a configured value used for a comparison. An internal state variable includes values stored in flops, registers, or counters, such as statistics. These values include the result of comparisons between stored values, such as the number of times that the value in a first counter has exceeded the value in a second counter. In this embodiment, each condition logic block 1402 has two counters that are dedicated to count the number of packets and the total number of segments (or bytes) that have been processed by the microcode in the control store 1406. There are also counters and status registers associated with the input, output, and management interfaces. Comparisons can be made between registers and local counters and/or global counters.

Each sub-block within FIG. 13 implements a specific comparison. Operand to data comparisons such as an equality 1502 and a range check 1504 are implemented by condition check circuits 1500, which are used to evaluate signature-based rules. Modification of internal state stored in flops, registers, or counters 1510 and comparisons between an internal state variable and an operand (or another internal state variable/register or a global state variable/counter) 1512 are implemented by condition analysis circuits 508, which can be used to evaluate behavioral rules or to collect statistics. There is an automatic update of internal states, such as the number of bytes of the current packet that have been processed so far, as specified by the opcode and configuration inputs. The results of the parallel sub-block comparisons are compounded by a block within a configurable output logic block 1514 (Boolean or sequential or both.) The select of the next address used by the selector 1404 and the outputs of the microcode controlled state machines visible to the aggregation circuit 1206 are set by the configurable output logic 1514.

Embodiments of this invention enable modification of network traffic that may have bitwise granularity (be granular to the bit) anywhere within the network traffic. Network traffic in the form of packets may be modified anywhere in the packet header or payload. These modifications to the packet header or payload may include changes of one or more existing bits, insertion of one or more bits, and removal of one or more bits. It is also contemplated that embodiments of this invention enable selective mirroring of input traffic with bitwise granularity, so that only traffic that needs to be looked at in detail is directed to an entity with a slower packet processing rate such as a CPU or sniffer.

Referring to FIG. 8, the architecture of an embodiment of the invention also supports granular traffic modifications and mirroring. After completing evaluation of a rule for a data segment corresponding to one or more input packets 695, each rule engine 1204 notifies the aggregation circuit 1206 via modification instruction lines of modifications to be made to each packet in the data segment. The modification instructions indicated by a rule engine 1204A may be identical to or overlap the modification instructions indicated by one or more of the other rule engines 1204B-1204N. Logic in the aggregation circuit 1206 that may include both sequential and combinatorial logic combines the modification instructions indicated by the rule engines 1204 into a modification command that includes indications of all modifications to be made to each packet in the data segment. When combining the modification instructions indicated by the rule engines 1204 into the modification command, the aggregation circuit 1206 may remove or modify modification instructions to eliminate redundancy.

For each packet in the data segment, the output interface 696 typically responds to a modification command from the aggregation circuit 1206 if the output interface 696 has received indications by the aggregation circuit 1206 on the decision line that the packet be forwarded, redirected, or duplicated. As the output circuit 696 receives traffic segments from the distribution circuit 1202 in response to the next packet and next segment indications, the output circuit 696 may buffer some or all of a packet to facilitate the modification of the packet by the output circuit 696. The output circuit 696 may contain memory that stores the modification command or a processed version of the modification command. As part of packet modification, the output circuit 696 may modify fields in the packet used for error detection or error correction, such as a frame check sequence (FCS) or cyclic redundancy check (CRC) field for the header, the payload, or the entire packet. If the output circuit 696 is inserting fields in a packet or encapsulating a packet with a new header, one or more new fields for error detection or error correction may be added to the packet.

Based on the outputs of the rule engines 1204, the aggregation circuit 1206 uses the duplication interface identifier lines to indicate to the output interface 696 that a packet is being redirected or duplicated, and the interface or interfaces to which the packet is being sent. The redirected or duplicated packet may be modified by the output interface 696. Mirrored data may correspond to one or more ports 800 that may be any combination of physical and logical ports. Mirrored data may be data redirected to the management interface 1212 from the output interface 696 or duplicated data directed to the management interface 1212 and also forwarded from the output interface 696. Some combination of the output interface 696 and the management interface 1212 may have a limited amount of memory to rate match traffic segments entering the output interface 696 from the distribution circuit 1202 to the output of the management interface 1212. Any rate matching may also be performed by external devices connected to the management interface 1212. The output of the management interface 1212 may combine mirrored data and management or control communications.

Packet modifications may facilitate network security and monitoring, such as by enabling selective monitoring of suspicious traffic, preventing attacks, or mitigating ongoing attacks. For example, input packets 695 in FIG. 8 with a non-standard or unassigned TCP port number may be modified, using the architecture shown in FIG. 8, into output packets 697 with a TCP port number mapped to a downstream secure application for monitoring. Input packets 695 from unknown sources with unauthorized Internet Protocol (IP) options may be modified into output packets 697 with, for example, the IP options deleted or modified to be non-operative to prevent or mitigate attacks. Input packets 695 with spoofed IP addresses may be modified into output packets 697 with the IP address of a downstream monitoring device.

This modification may also facilitate traffic management in addition to or independently of facilitating network security. For example, input packets 695 may be modified into output packets 697 with an inserted virtual local area network (VLAN) tag or with a multi-protocol label switching (MPLS) tag that may correspond to the customer sending the input packets 695, to a specific LAN segment in the case of the VLAN tag, or to a specific MPLS tunnel in the case of the MPLS tag. This is an example of packet tagging. Input packets 695 may be modified into output packets 697 with a removed or modified VLAN tag or MPLS tag. Input packets 695 may also be modified into output packets 697 with a multi-protocol label switching (MPLS) tag containing a quality of service marking that indicates the type of processing that this packet must receive from downstream devices. This operation is an example of packet coloring.

This modification may also facilitate integration of devices within a system. For example, input packets 695 may be modified into output packets 697 that have an encapsulated header. This encapsulated header may convey control information of meaning to a particular downstream device. One common purpose of header encapsulation is to indicate the results of pre-processing of input packets 695 by a device with the architecture shown in FIG. 8 so that downstream devices such as NPs that receive output packets 697 need not repeat the same processing, saving computational resources and improving network performance.

Mirroring is used to direct input traffic to an entity such as a CPU or sniffer for detailed traffic monitoring and analysis. Selective mirroring across the input ports 800 is desirable because a CPU or sniffer generally cannot process packets at the same rate as the architecture of FIG. 8, which is designed for high-speed, multi-gigabit per second data rates. Accordingly, only traffic that needs to be looked at in detail should be directed to an entity such as a CPU or sniffer.

Mirroring with bitwise granularity enables selective, precise, surgical mirroring. Use of the architecture shown in FIG. 8 to flexibly filter high-speed traffic enables a CPU or sniffer to be used for precisely targeted traffic sent out the management interface 1212. There is also no restriction on the types of the ports 800, such as a physical port or a logical port defined by a virtual LAN, that may be mirrored to the management interface 1212. For example, it may be desirable to inspect only packets reporting stock quotes or from a particular website. The deep packet inspection supported by the architecture of FIG. 8 enables application of rules including signature-based rules, where the signature can appear in the header or payload of individual packets, or across a sequence of packets. Behavioral rules may also be integrated with signature-based rules to define the criteria for selective mirroring. The filtering of high-speed traffic using a combination of signature-based and behavioral rules may be adapted to generate a system level solution that best leverages the processing capabilities of the CPU or the sniffer, without requiring costly NPs or CAMs. For example, the architecture of FIG. 8 may apply an inclusive signature-based rule for mirrored traffic if the mirrored traffic load is substantially less than the maximum processing capability of the sniffer, and may apply progressively stricter signature-based rules as the mirrored traffic load approaches the maximum processing capability of the sniffer.

The architecture of FIG. 8 is hardware-based and optimized for header analysis, deep packet inspection, and packet modification applications. In particular, the architecture does not incorporate designs of general purpose components such as CPUs. To avoid an intrusive re-design of the hardware, registers, and low-level software of NPs and switches, a simple way to incorporate this architecture into existing off-the-shelf components is to integrate the architecture into a component at the physical layer (PHY) or at a combination of the PHY and media access control sublayer (MAC) of the seven-layer Open Systems Interconnection (OSI) reference model for networking protocol layers. These layers, moving upwards from raw bits on a communication channel to application protocols commonly used by end users, include the physical layer, the data link layer, the network layer, the transport layer, the session layer, the presentation layer, and the application layer. The partitioning of the layers of the OSI reference model is based on principles including clear definition of the functions performed by each layer, abstraction of layers to minimize inter-layer dependencies, and facilitation of the definition of standards.

Referring to FIG. 8, the architecture of an embodiment of the invention also supports data reduction, push-based management, alert generation, and network latency and jitter analysis. As described with reference to FIG. 7, these functions are supported by logic included in the traffic analysis logic 694. In one embodiment, the traffic analysis logic 694 includes dedicated hardware logic for performing each of these functions. The traffic analysis logic 694, along with the rest of the architecture shown in FIG. 8, may be included in a single chip. The single chip may be a system-on-chip, and may include one or more integrated circuits. The traffic analysis logic 694, along with the rest of the architecture shown in FIG. 8, may be implemented in hardware circuitry and/or in reconfigurable logic. Alternatively, the traffic analysis logic 694 may be implemented in firmware.

The traffic analysis logic 694 may be configured to receive network data related information (such as the network data related information 686 described with reference to FIG. 6) and flow identification information from the microcode controlled state machines 1204. Referring to FIG. 7, one or more of data reduction logic 700, push logic 702, alert generation logic 704, network latency and jitter analysis logic 706, computation logic 708, and control logic 710 are configured to process the network data related information and the flow identification information as part of performing their functions. In addition, the traffic analysis logic 694 may be configured to receive control information (such as the control information 688 described with reference to FIG. 6) from the distribution circuit 1202. Referring to FIG. 7, the control logic 710 may be configured to process the control information, and to convert the control information into signals for configuring one or more of the data reduction logic 700, the push logic 702, the alert generation logic 704, the network latency and jitter analysis logic 706, and the computation logic 708. In one embodiment, packets including network traffic analysis data generated by the push logic 702 (such as the network traffic analysis data 690 described with reference to FIG. 6) are provided to the output interface 696 in response to the next packet signal from the output interface 696.

In one embodiment, the microcode controlled state machines 1204 may be configurable responsive to the control information to vary a time granularity at which unreduced statistical data is collected. The control information may be provided to the microcode controlled state machines 1204 by the distribution circuit 1202 in a similar manner to how segments of the input packets 695 are provided to the microcode controlled state machines 1204.

Packet modifications, as described previously with reference to FIG. 8, may also facilitate measurement of network latency in addition to or independently of facilitating network security and traffic management. For example, input packets 695 included in one or more data flows (such as logical ports 800) may be modified into output packets 697 with an inserted timestamp. The timestamp may indicate a transmission time. The content of the timestamp may be determined based on a time reference signal provided by a time source coupled to the microcode controlled state machines 1204. The timestamp may be provided as part of the modification instruction to the aggregation circuit 1206.

Referring to FIG. 11, the condition logic 1402 may be configured by microcode stored in the control store 1406 to evaluate a rule to measure per-packet network latency associated with input packets 695 included in one or more data flows (such as logical ports 800).

Figure 14:
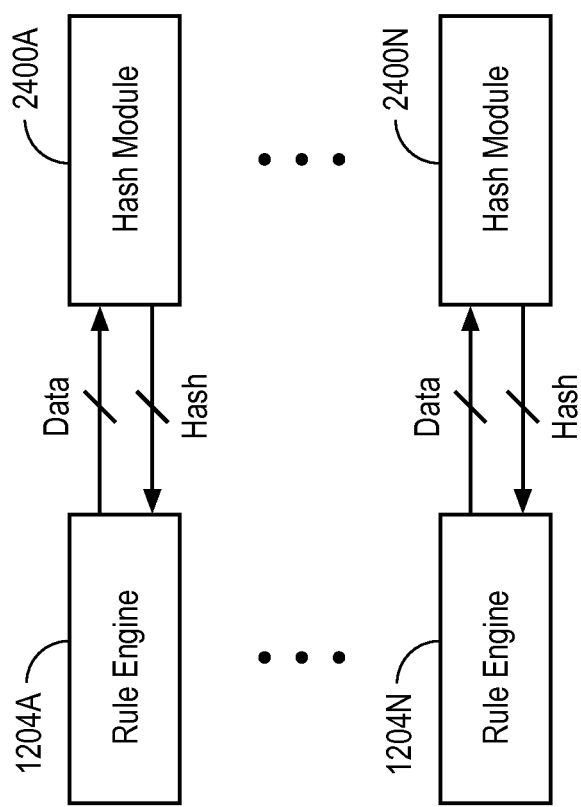
FIG. 14 illustrates a logical block diagram of an interface between rule engines and their associated hash modules, in accordance with an embodiment of the invention.

Referring to FIG. 8, each rule engine 1204 may interface to an associated hash module. FIG. 14 illustrates a logical block diagram of the interface between rule engines 1204 and their associated hash modules 2400, in accordance with one embodiment of the invention. Each rule engine 1204 can apply a rule to extract one or more fields from an input network data unit, such as an input packet. The rule may have bitwise granularity across the header and payload of the packet, so that the extracted fields may have bitwise granularity and be from any portion of the packet. Each rule engine 1204 provides the extracted fields to a hash module 2400. In one embodiment, each rule engine 1204 may provide a measured per-packet network latency to the hash module 2400. Each hash module 2400 processes the data to generate a hash identifier that is desirably of lesser width in bits than the extracted fields provided to the hash module 2400, and provides the hash identifier back to the rule engine 1204 that provided the extracted fields. The hash identifier may be associated with a packet type or packet flow, or more generally, with any subset of network data units sharing a property or attribute. Each hash module 2400 may be configured via the management interface 1212. In one embodiment, the hash identifiers may be provided to the management interface 1212.

Alternatively, each rule engine 1204 may generate the hash identifier as part of its processing of input network data units. In this case, the function of the hash modules 2400 is performed by the rule engines 1204, making separate hash modules 2400 unnecessary.

In one embodiment, each rule engine 1204 can apply a rule to produce modification instructions based on the categorization information, such as the hash identifier. The modification instructions may include the hash identifier. The aggregation circuit 1206 can combine the modification instructions indicated by the rule engines 1204 into a modification command that is provided to the output circuit 696, as described previously. Based on the modification command, the output circuit 696 can append the hash identifier to the network data unit. The hash identifier may be added to any part of the network data unit, such as the header. Based on the routing decision of the aggregation circuit 1206, the output circuit 696 can provide the modified network data unit to a management system via the management interface 1212. The output circuit 696 may also transmit the modified network data unit to downstream devices. One benefit of attaching categorization information, such as a hash identifier, to a network data unit passed to other devices in the network is so that the network traffic processing and analysis capabilities of an upstream device can be leveraged by downstream devices. The downstream devices may not have the same traffic processing and analysis capabilities as the upstream device. The downstream devices also may leverage the categorization information associated with a received network data unit to simplify and streamline the network traffic processing and analysis performed at the downstream devices.

Embodiments of the invention are cost-effective, simple to use, manageable, and flexible. With a unified algorithm and block design across the distribution circuit 1202, the rule engines 1204, and the aggregation circuit 1206, the apparatus performs header analysis, deep packet inspection, and packet modification functions without the use of multiple, costly co-processors such as NPs for header processing and packet modification and a CAM for pattern matching. The apparatus can be incrementally deployed to balance risk with the available budget. The apparatus may be integrated with and deployed as part of a physical layer, data link layer, or other lower layer interface to enable higher layer rule-based processing in cost-effective, low power devices that do not use any of the computational resources of NPs and CAMs. The architecture of the apparatus is adapted to header analysis, deep packet inspection, and packet modification at multi-Gb/s and higher input speeds. The apparatus provides an interface 1212 for management and monitoring of the network, configuration of its specialized features, and output of mirrored data, and may also support the use of pre-processors and post-processors for specific customer needs.

Embodiments of the invention also have predictable and easily verifiable performance, based on its architecture. The implementation of the set of rule engines 1204 as a pipelined fabric of microcode state machines that operate concurrently and collaboratively ensures that the worst-case throughput and latency through the apparatus can be calculated and bounded. As a result, accurate predictions can be made about when the apparatus can run at wire speed. Wire speed operation is fast enough to process, without unintended traffic loss, the worst case combination of input packet size and packet rate in packets per second given maximum rule complexity. Also, since there is a deterministic worst-case number of clock cycles for processing of any traffic segment by a rule engine 1204, the apparatus can have small, bounded processing delay across mixes of traffic types, packet sizes, and rule complexity. Small, bounded delay means that simple, on-chip buffers can be used by the apparatus rather than external memory or caches that may require complex memory hierarchy or queuing structures. The use of simple, on-chip buffers not only increases apparatus performance through efficient and optimal use of hardware resources such as gates and memory elements, but also avoids corner cases related to various traffic patterns. It also enables validation using formal verification and structural coverage, which reduces the likelihood of design escapes and errors.

An important objective of network operators is to quickly identify, diagnose, and fix network problems. As networks grow in size and complexity, identifying and diagnosing these network problems can become increasingly difficult due to the huge amounts of network data that may need to be analyzed. As previously described, the system 600 for network monitoring and network analysis of FIG. 2 includes the network devices 602, which may efficiently perform monitoring, filtering, aggregation, replication, balancing, timestamping, and/or modification of network traffic within a unified architecture, based on rules that may be highly granular (such as granular to the bit) anywhere within the network traffic, while at the same time acting as a "bump in the wire" by minimizing perturbation of the network traffic introduced by the network devices 602. By performing at least this wide variety of functions, the network devices 602 may process the network traffic to obtain network analysis data that the network devices 602 may provide to the management station 604 to support a wide variety of search requests received by the management station 604, and to generate alert indications, such as of anomalous network conditions. In addition, as previously described, the performance of significant portions of data analysis and processing functions at the network devices 602 instead of at the management station 604 has various advantages, including reducing the volume of the network analysis data to be reported to the management station 604, and reducing processing and memory requirements at the management station 604.

Although conventional, static network maps can show a representation of physical connectivity between network devices similar to a representation of highways connecting cities on a paper map, these network maps may not provide real-time visualizations of dynamically changing network conditions, such as but not limited to network congestion, network traffic anomalies such as microbursts, application misbehavior, and/or intermittent network availability. To help a network operator efficiently identify and diagnose network problems based on these dynamically changing network conditions, it is advantageous to provide a dynamic overlay of real-time network information, such as network traffic analysis information and alerts, onto a conventional, static network map. It is advantageous for this dynamic network map overlay to visualize the real-time network analysis information and alerts provided by the network devices 602 so that the network operator can effectively leverage the network traffic processing and analysis capabilities of the network devices 602.

Figure 15:
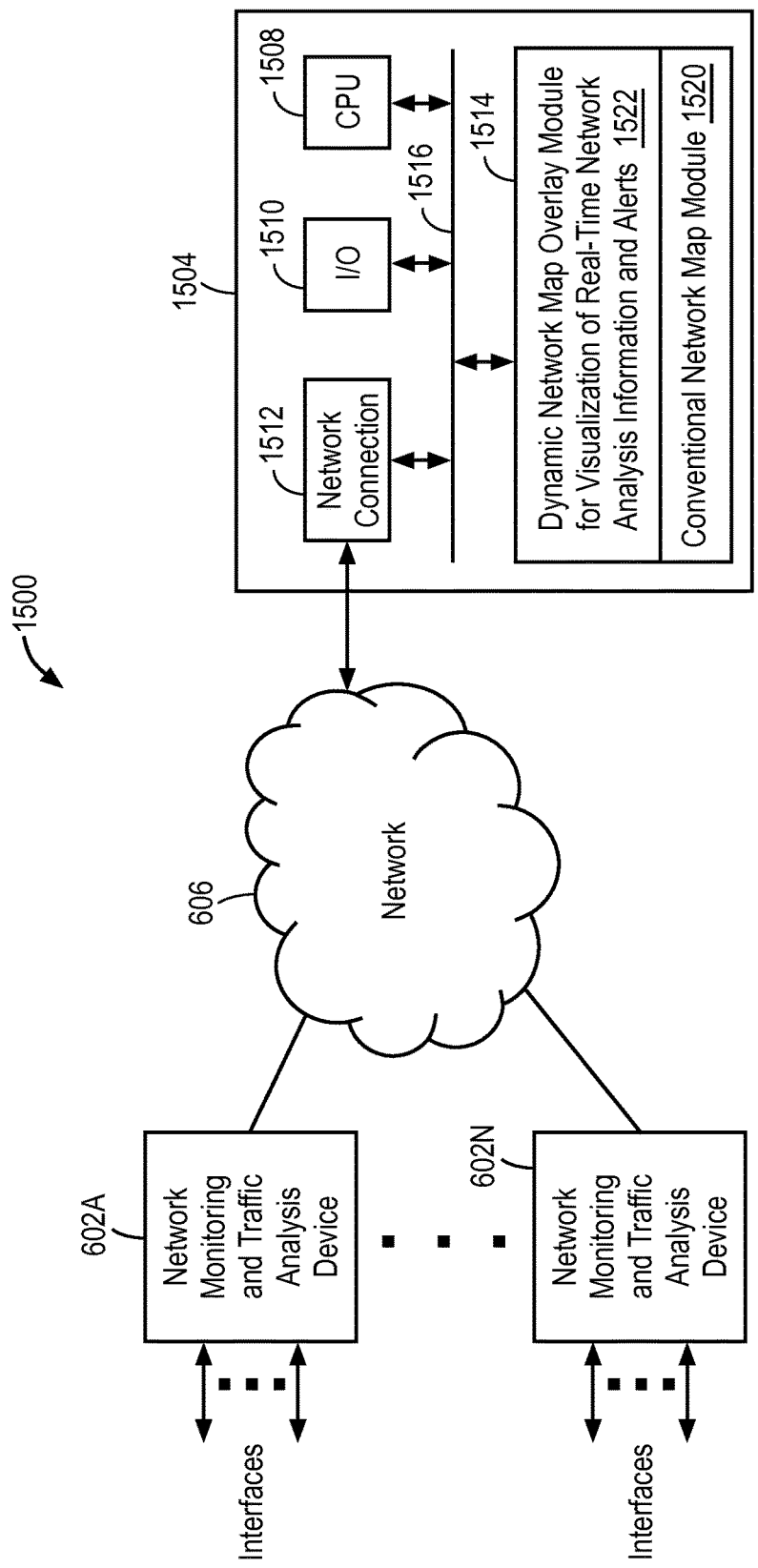
FIG. 15 illustrates a system for visualizing real-time network analysis information and alerts, in accordance with an embodiment of the invention.

FIG. 15 illustrates a system 1500 for visualizing real-time network analysis information and alerts, in accordance with an embodiment of the invention. The system 1500 includes the network 606 connecting the network monitoring and traffic analysis devices 602A-602N with a management station 1504. The management station 1504 includes standard components, such as a network connection 1512, a CPU 1508, and an input/output device 1510, which communicate over a bus 1516. The memory 1514 stores a set of executable programs that may be used to implement functions of embodiments of the invention.

In one embodiment, the management station 1504 includes executable instructions establishing the various modules of the management station 1504 shown in FIG. 15. The conventional network map module 1520 generates and displays a representation of physical connectivity between network devices in accordance with the prior art. The dynamic network map overlay module 1522 generates and displays a visualization of real-time network analysis information and alerts, such as that provided by the network devices 602, that can be overlaid on the conventional network map. In other respects, the management station 1504 is similar to the management station 604 as previously described, so that description is not repeated here.

In one embodiment, the management station 1504 is coupled to the network devices 602 over the network 606. The management station 1504 may be configured to generate a map of the network 606 including a visual indicator based on network traffic analysis information provided by the network devices 602, to receive an update of the network traffic analysis information from one or more of the network devices 602, and to refresh the visual indicator in real time to reflect the update of the network traffic analysis information. For example, the dynamic network map overlay module 1522 may generate the visual indicator based on the network traffic analysis information, and may refresh the visual indicator in real time to reflect updates to the network traffic analysis information received from the network devices 602.

For example, the visual indicator may be associated with detection of a characteristic of network data traversing one or more ports of the network devices 602. The visual indicator may be based on a number of times that the characteristic has been detected in the network data, or on some other aspect related to the characteristic of the network data. The characteristic of the network data may be any characteristic indicated by network analysis data as previously described, such as with reference to FIGS. 1-8 and their associated descriptions. The network traffic analysis information may be determined by the network devices 602 as previously described, such as with reference to FIGS. 1-14 and their associated descriptions.

In one embodiment, the management station 1504 may be configured to receive a search request implicating the characteristic of the network data traversing one or more ports of the network devices 602. The management station 1504 may then generate a communication to one or more of the network devices 602 based on the search request, and may receive network traffic analysis information associated with the characteristic of the network data from one or more of the network devices 602 in response to the communication from the management station 1504.

It will be understood by one of ordinary skill in the art that the visual indicators associated with dynamic network map overlays may be associated with any characteristic indicated by network analysis data as previously described, such as with reference to FIGS. 1-8 and their associated descriptions. Because the network analysis data is determined by the network devices 602 as previously described rather than at the management station 1504, such as with reference to FIGS. 1-14 and their associated descriptions, the visual indicators may reflect a much wider variety of information than may be available from typical network management systems in addition to updating in real time. Furthermore, the network devices 602 can determine the network analysis data concurrently for every port (physical port and/or logical port). By providing visual indicators based on this network analysis data concurrently per port across a large network, the system 1500 can therefore can help a network operator efficiently identify, diagnose, and respond to network problems based on dynamically changing network conditions. For example, this information may include but is not limited to results of application of a combination of signature-based and behavioral rules to network data with bitwise granularity (see description with reference to FIG. 2), results of application of complex mathematical operations to analysis of network traffic information (see description with reference to FIG. 7), reduced network performance data that can indicate network phenomena such as microbursts (see description with reference to FIGS. 4A through 4C and FIG. 7), network latency information (see description with reference to FIG. 5).

Figure 16A:
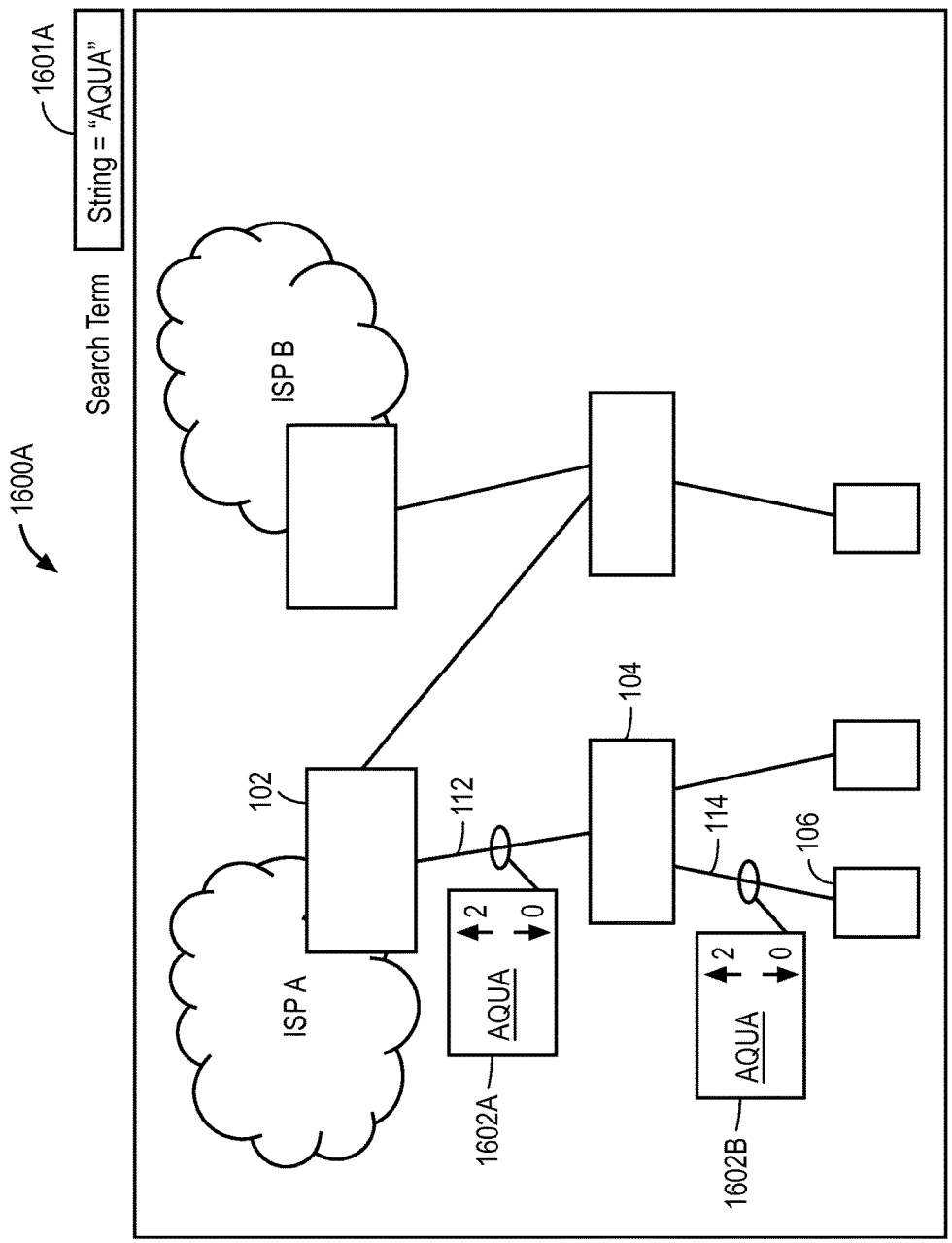
FIG. 16A illustrates an example of a display including dynamic network map overlays providing visualizations of real-time network analysis information and/or alerts in response to a search term, in accordance with an embodiment of the invention.
Figure 16B:
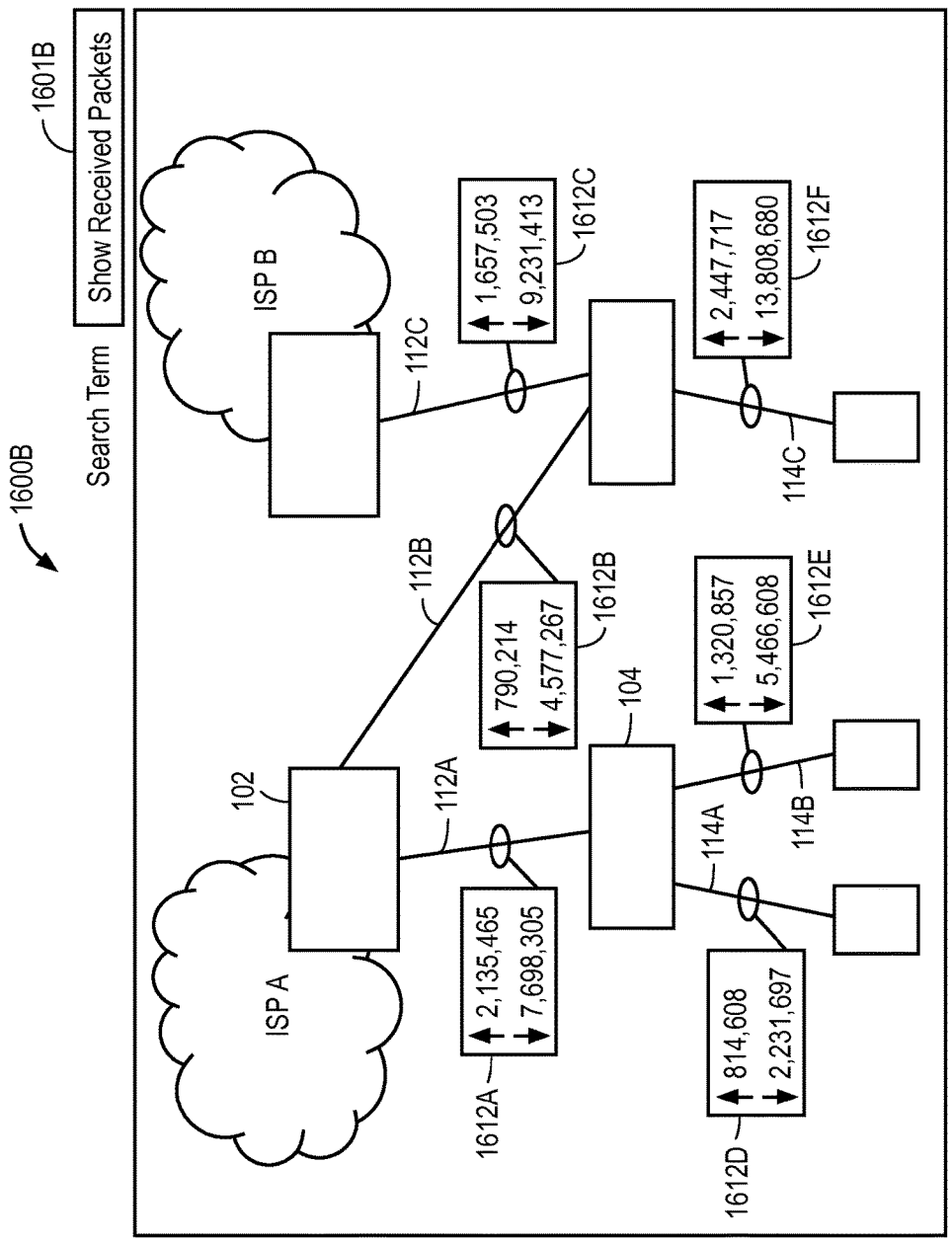
FIG. 16B illustrates an example of a display including dynamic network map overlays providing visualizations of real-time network analysis information and/or alerts in response to a search term, in accordance with an embodiment of the invention.
Figure 16C:
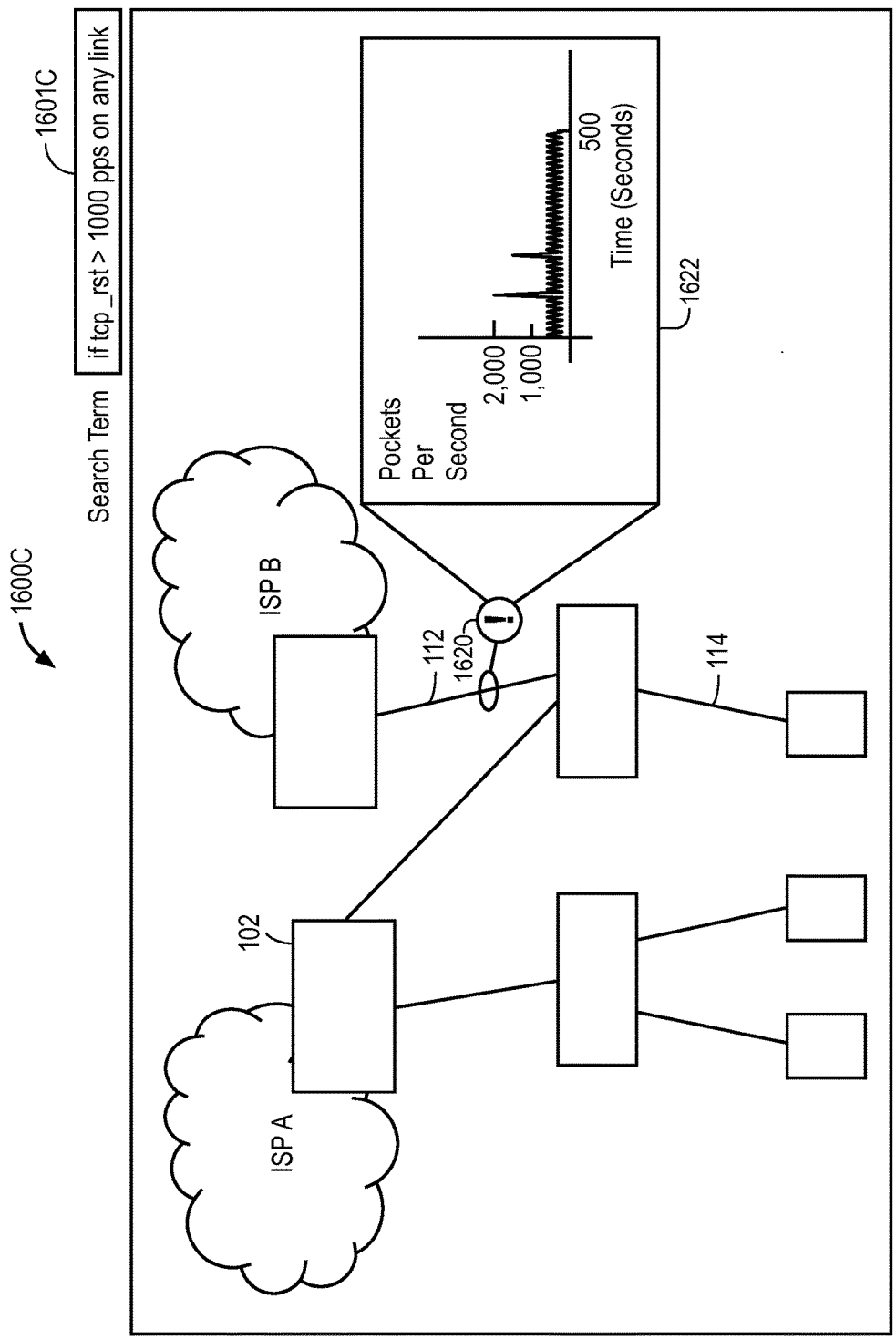
FIG. 16C illustrates an example of a display including dynamic network map overlays providing visualizations of real-time network analysis information and/or alerts in response to a search term, in accordance with an embodiment of the invention.

FIGS. 16A through 16C illustrate examples of displays 1600A-1600C including dynamic network map overlays providing visualizations of real-time network analysis information and/or alerts in response to search terms 1601A-1601C, in accordance with an embodiment of the invention. Various types of network devices may be shown in FIGS. 16A through 16C, including but not limited to core switches 102, edge routers 104, and access switches 106, as previously described with reference to FIG. 1. The core switches 102 may act as the interface to an internet service provider (ISP). The links 112 that may connect the core switches 102 the edge routers 104 and the links 114 that connect to the access switches 106 through multiple links 114 are also previously described with reference to FIG. 1.

In the example of FIG. 16A, the search term 1601A is the string "AQUA". The number of packets detected on the links 112 and 114, respectively, containing the string "AQUA" is shown in the dynamic network map overlays 1602A-1602B. The links 112 and 114 may be bidirectional, or alternatively may be unidirectional. The number of packets detected on the links 112 and 114, respectively, containing the string "AQUA" is an example of network traffic analysis information that may be determined and provided by the network devices 602 (see FIG. 15), as previously described. The dynamic map overlays 1602 are updated in real time as the number of packets detected on the links 112 and 114, respectively, containing the string "AQUA" is updated based on the latest network traffic analysis information provided by the network devices 602. In this way, the display 1600A provides a dynamic network view based on the search term 1601A, and that updates in real time to reflect the latest network traffic analysis information provided by the network devices 602.

In the example of FIG. 16B, the search term 1601B is a request to show the number of received packets on each of the links 112A-112C and 114A-114C. The number of packets detected as received on the links 112A-112C and 114A-114C, respectively, is shown in the dynamic network map overlays 1612A-1612F. The links 112 and 114 may be bidirectional, or alternatively may be unidirectional. The number of packets detected as received on the links 112 and 114, respectively, is an example of network traffic analysis information that may be determined and provided by the network devices 602 (see FIG. 15), as previously described. The dynamic map overlays 1612 are updated in real time as the number of packets detected as received on the links 112 and 114, respectively, is updated based on the latest network traffic analysis information provided by the network devices 602. In this way, the display 1600B provides a dynamic network view based on the search term 1601B, and that updates in real time to reflect the latest network traffic analysis information provided by the network devices 602.

In the example of FIG. 16C, the search term 1601C is a request to provide an alert indication showing links 112 and 114 on which the number of TCP reset packets per second has exceeded 1000. A spike in the number of TCP reset packets may indicate, for example, that a TCP reset attack has occurred or may be occurring. An example of an alert indication for the link 112 is the dynamic map overlay 1620. In addition, dynamic map overlay 1622 is an example of drill-down information that may be provided to illustrate more detailed information showing the history of the number of TCP reset packets per second on the link 112. The links 112 and 114 may be bidirectional, or alternatively may be unidirectional. The alert indication and the history of the number of TCP reset packets per second on the link 112 are examples of network traffic analysis information that may be determined and provided by the network devices 602 (see FIG. 15), as previously described. The dynamic map overlays 1620 and 1622 can be updated in real time as the alert indication and the history of the number of TCP reset packets per second on the link 112, respectively, are updated based on the latest network traffic analysis information provided by the network devices 602. In this way, the display 1600C provides a dynamic network view based on the search term 1601C, and that updates in real time to reflect the latest network traffic analysis information provided by the network devices 602. In addition, visual indications such as the alert indication shown by the dynamic map overlay 1620, once shown on the display 1600C, may remain on the display 1600C until the management station 1504 (see FIG. 15) receives an acknowledgement of the alert.

One way to identify and diagnose network problems is to detect an event indicative of a problem in a network, then to attempt to collect network data at various points in the network in the hope that the event will re-occur. The data can be collected by manually connecting a sniffer and a disk at each of multiple points in the network to monitor and collect the network data at those network locations. If the event re-occurs, the collected network data can be analyzed to locate and examine the network data shortly before and after occurrence of the event to facilitate identification and diagnosis of the root cause of the network problem. However, this after-the-fact approach to network data collection can be inefficient and costly. Manual connection and configuration of the sniffer and the disk at each point in the network where data collection is desired can require significant effort, and the cost of purchasing multiple sniffers and disks to enable concurrent monitoring of high-speed interfaces (such as multi-10 Gbps interfaces) at multiple points in the network can be expensive. Moreover, it can be time-consuming to sift through the huge amount of collected network data to find the network data shortly before and after occurrence of the event.

Figure 17:
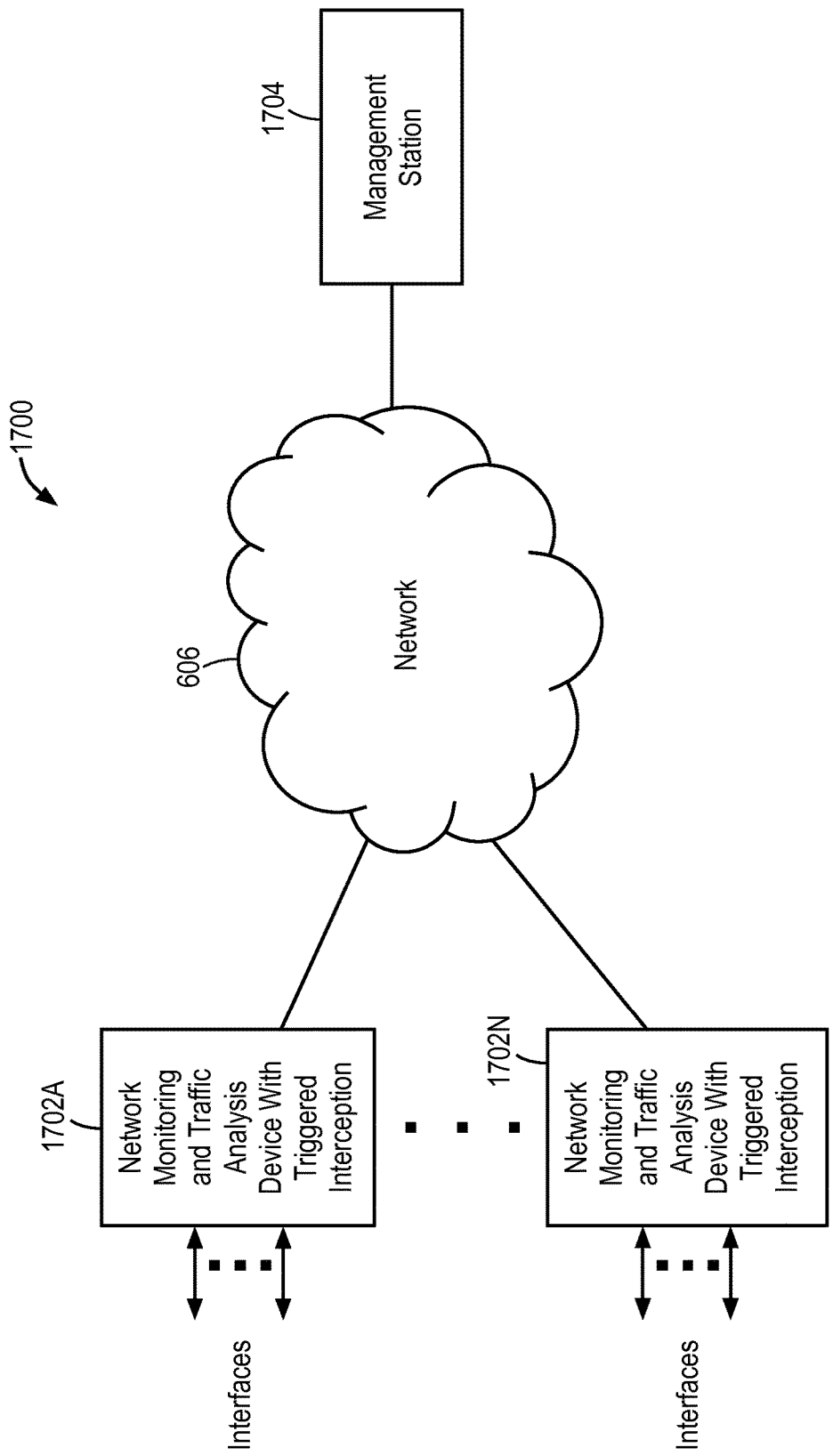
FIG. 17 illustrates a system for performing triggered interception of network data, in accordance with an embodiment of the invention.

FIG. 17 illustrates a system 1700 for performing triggered interception of network data, in accordance with an embodiment of the invention. The system 1700 includes the network 606 connecting network monitoring and traffic analysis devices 1702A-1702N with triggered interception with a management station 1704. In one embodiment, each of the network devices 1702 is configured to apply one or more rules to the network data received by the corresponding one of the network devices 1702 to determine a characteristic of the network data. Each rule can be applied on a per-interface basis, such as per physical port or per logical port. The network devices 1702 can be configured to apply the one or more rules by the management station 1704. The characteristic of the network data may be any characteristic indicated by network analysis data as previously described, such as with reference to FIGS. 1-8 and their associated descriptions.

In one embodiment, each of the network devices 1702 is configured to store a first portion of the network data received by the corresponding one of the network devices 1702 prior to the determination of the characteristic of the network data, to store a second portion of the network data received by the corresponding one of the network devices 1702 subsequent to the determination of characteristic of the network data, and to preserve the first portion and the second portion of the network data in response to the determination of the characteristic of the network data. In this way, each of the network devices 1702 can be triggered to intercept a limited amount of network data directly before and after occurrence of a triggering event corresponding to determination of the characteristic of the network data. Examination of this intercepted network data can provide insight into network conditions both before and after occurrence of the event to facilitate identification and diagnosis of the root cause of a suspected network problem. The network devices 1702 can be configured to analyze the intercepted network data and to provide the resulting network analysis data to the management station 1704. Alternatively or in addition, the network devices 1702 can be configured to provide the intercepted network data to the management station 1704.

In aspects other than those related to triggered interception, the network devices 1702 are similar to the network devices 602 and/or 1502 as previously described, and the management station 1704 is similar to the management station 604 and/or 1504 as previously described, so that description is not repeated here.

Because the triggered interception functionality is built into the network devices 1702, the system 1700 can concurrently perform triggered interception at each network device 1702 across the network 606 to collect data for a limited interval before and after a triggering event, and on a per physical port and/or per logical port basis. The limited interval may, for example, be a configurable time duration or a configurable number of packets. The triggered interception at each of the network devices 1702 can also be centrally configured and monitored from the management station 1704. For these reasons, the system 1700 enables a network operator to view and analyze intercepted data across the network 606 efficiently from a centralized location without needing to sift through large quantities of irrelevant data. In addition, the triggered interception functionality of the system 1700 can render unnecessary manual connection and configuration of a sniffer and a disk at each point in the network 606 where data collection is desired, saving both effort and cost.

Figure 18:
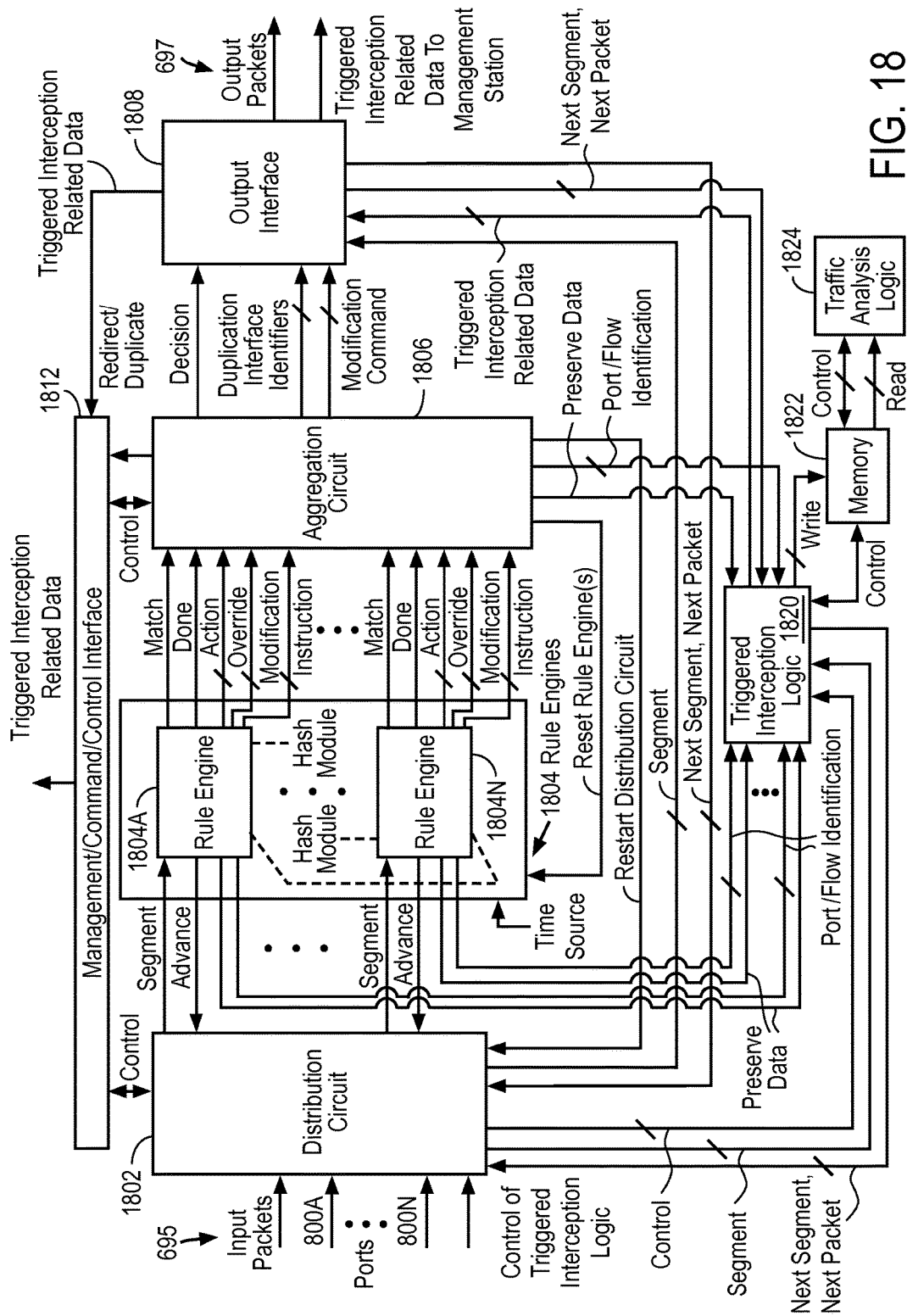
FIG. 18 illustrates a logical block diagram of an architecture of the network devices shown in FIG. 17 that supports triggered interception of network data, in accordance with an embodiment of the invention.

FIG. 18 illustrates a logical block diagram of an architecture of the network devices 1702 shown in FIG. 17 that supports triggered interception of network data, in accordance with an embodiment of the invention. The description of FIG. 8 applies to FIG. 18. In aspects other than those related to triggered interception, the distribution circuit 1802, the rule engines 1804, the aggregation circuit 1806, the output interface 1808, the management interface 1812, and the traffic analysis logic 1824 are similar to the distribution circuit 1202, the rule engines 1204, the aggregation circuit 1206, the output interface 696, the management interface 1212, and the traffic analysis logic 694, respectively, that have been previously described with reference to FIGS. 6 and 8, so that description is not repeated here. To simplify FIG. 18, the connections between the traffic analysis logic 1824 and the distribution circuit 1802, the rule engines 1804, and the output interface 1808 are not shown, but it is understood that those connections may still be present and may correspond to those shown in FIG. 8 between the traffic analysis logic 694 and the distribution circuit 1202, the rule engines 1204, and the output interface 696.

In one embodiment, one or more of the rule engines 1804 are configured to apply one or more rules to the received network data 695 to determine a characteristic of the network data 695. Each rule can be applied to one or more of the ports 800A-800N, where each of the ports 800 can be a physical port or a logical port. The characteristic of the network data 695 (the triggering event) may be any characteristic indicated by network analysis data as previously described, such as with reference to FIGS. 1-8 and their associated descriptions. The distribution circuit 1802 may also concurrently provide the network data 695 to triggered interception logic 1820 via an interface similar to that previously described with reference to FIG. 8 between the distribution circuit 1202 and the output interface 696. The triggered interception logic 1820 may store the network data 695 received from the distribution circuit 1802 in the memory 1822. In one embodiment, the memory 1822 may be configured as a circular buffer, so that when the memory 1822 is full, the oldest data stored in the memory can be re-written. In another embodiment, the memory 1822 may be divided into multiple areas (portions), each one of which is configured as a circular buffer, and the triggered interception logic 1820 may store the network data 695 received from the distribution circuit 1802 in one or more of the areas of the memory 1822. For example, each area of the memory 1822 may store the network data 695 received on a particular port 800.

Even if the characteristic of the network data 695 has not been detected, the triggered interception logic 1820 may store the network data 695 in the memory 1822 as it is received, so that when the characteristic of the network data 695 is detected, network data prior to the triggering event is already stored in the memory 1822 and available for analysis.

Upon determination of the characteristic of the network data 695 by one or more of the rule engines 1804, the one or more rule engines 1804 may provide a preserve data indication to the triggered interception logic 1820. After receipt of the preserve data indication, the triggered interception logic 1820 stores a first portion of the network data 695 received prior to the determination of the characteristic of the network data 695 (the triggering event) in the memory 1822, stores a second portion of the network data 695 received subsequent to the determination of characteristic of the network data 695 in the memory 1822, and preserves the first portion and the second portion of the network data 695 in response to the determination of the characteristic of the network data 695. The triggered interception logic 1820 may configure a first area of the memory 1822 to preserve the first portion and the second portion of the network data 695, and may optionally configure a different second area of the memory 1822 as a circular buffer to store the network data 695 received subsequent to the second portion of the network data 695. The one or more rule engines 1804 may also provide a port/flow identification indication to the triggered interception logic 1820 to indicate that the preserve data indication refers to the network data 695 received for a particular port or flow.

Alternatively or in addition, the characteristic of the network data 695 may be determined by the aggregation circuit 1806 as a logical combination of outputs of multiple rule engines 1804. In this embodiment, the aggregation circuit 1806 may provide the preserve data indication, and optionally the port/flow identification indication, to the triggered interception logic 1820.

The rule engines 1804 and/or the aggregation circuit 1806 may be configured to generate the preserve indication to the triggered interception logic 1820 a configurable interval after the determination of the characteristic of the network data 695. The configurable interval may be, but is not limited to, a configurable time interval, a configurable number of received packets, or a configurable number of received bytes.

In one embodiment, one or more of the rule engines 1804 may apply a first rule to determine the characteristic of the network data 695 (the triggering event). One or more of the rule engines 1804 may also apply a second rule to, for example, select a subset of data flows from the set of data flows included in the network data 695 such that the portion of the network data 695 that is preserved is associated with the subset of the data flows.

After preservation of the first portion and the second portion of the network data 695 in the memory 1822, triggered interception related data may be provided to the management station 1704 (see FIG. 17) for analysis. The triggered interception related data may be the portions of the network data 695 preserved in the memory 1822. Alternatively or in addition, the triggered interception related data may be network analysis data determined by the traffic analysis logic 1824 based on processing of the portions of the network data 695 preserved in the memory 1822. The network analysis data may be determined by the network devices 1702 as previously described, such as with reference to FIGS. 1-14 and their associated descriptions. The traffic analysis logic 1824 may process the portions of the network data 695 preserved in the memory 1822 to determine whether one or more of the portions of the network data 695 implicate a second characteristic different from the characteristic associated with the triggering event.

The triggered interception related data may be provided to the management station 1704 over the data path. Alternatively or in addition, the triggered interception related data may be provided to the management station 1704 via the management interface 1812. The triggered interception related data may be pushed to the management station 1704 independent of a solicitation from the management station 1704, or may be provided to the management station 1704 in response to polling by the management station 1704.

It will be understood by one of ordinary skill in the art that the embodiments described in this specification may process various forms of network traffic, including but not limited to packets. For example, the embodiments described in this specification may process cells or frames.

Embodiments of the invention may enable network monitoring that may be sufficiently comprehensive to identify network phenomena that may not be identifiable by previous network monitoring and management systems, such as microbursts or new types of viral attacks not recognized by firewalls or AV software. Effective monitoring requires extensive collection of network statistics to enable network behavioral analysis. Collection of statistics may be supplemented by snapshot copying of all collected statistics at an instant, or aggregation and correlation of information from multiple apparatuses to provide a clear view of network status and behavior.

An embodiment of the invention relates to a computer storage product with a computer-readable medium having computer code thereon for performing various computer-implemented operations. The term "computer-readable medium" is used herein to include any medium that is capable of storing or encoding a sequence of instructions or computer codes for performing the operations described herein. The media and computer code may be those specially designed and constructed for the purposes of the invention, or they may be of the kind well known and available to those having skill in the computer software arts. Examples of computer-readable media include, but are not limited to:

magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system for monitoring and visualization of network data, comprising:
    a plurality of first devices, each of the plurality of first devices comprising a processor being associated with corresponding ones of a plurality of ports, each of the plurality of first devices being configured to determine network traffic analysis information associated with a characteristic of network data traversing each of the plurality of ports, and to push the network traffic analysis information across a network independent of a solicitation from the network; and
    a second device coupled to the plurality of first devices over the network, the second device comprising a processor being configured to generate a map of the network including a visual indicator based on the network traffic analysis information, to receive an update of the network traffic analysis information from at least one of the plurality of first devices, and to refresh the visual indicator in real time to reflect the update of the network traffic analysis information; wherein
    each of the plurality of first devices is configured to determine statistical data over each of a plurality of time intervals of a first time granularity based on the network data; and
    the statistical data reduces the volume of the network traffic analysis information; and
    each of the plurality of first devices is configured to determine the network traffic analysis information based on performance of a mathematical operation on the statistical data, wherein the network traffic analysis information is associated with each of a plurality of time intervals of a second time granularity, the first time granularity being finer than the second time granularity.

2. The system of claim 1, wherein the visual indicator is based on a number of times that the characteristic has been detected in the network data over a time interval.

3. The system of claim 2, wherein the characteristic is indicated based on an occurrence of a bit pattern in the network data.

4. The system of claim 2, wherein the characteristic is indicated based on an occurrence of a pattern of variation in a data rate associated with the network data.

5. The system of claim 1, wherein each of the plurality of first devices is configured to determine the network traffic analysis information based on application of at least one of a signature-based rule and a behavioral rule to the network data.

6. The system of claim 1, wherein the mathematical operation includes at least one of a minimum, a maximum, and an average.

7. The system of claim 1, wherein:
    the network traffic analysis information includes a maximum of the statistical data over each of the plurality of time intervals of the second time granularity; and
    the characteristic of the network data is indicated by the maximum of the statistical data over at least one of the plurality of time intervals of the second time granularity substantially exceeding the average of the statistical data over the at least one of the plurality of time intervals of the second time granularity.

8. The system of claim 1, wherein each of the plurality of first devices is configured to determine the network traffic analysis information based on performance of a mathematical operation on at least one of statistics and rule-based information associated with the network data, wherein the mathematical operation includes at least one of a convolution, a moving average, a sum of squares, a linear filtering operation, and a nonlinear filtering operation.

9. The system of claim 8, wherein the visual indicator is based on a result of the mathematical operation on the network data.

10. The system of claim 1, wherein each of the plurality of first devices is configured to generate an alert indication associated with the corresponding ones of the plurality of ports based on detection of the characteristic in the network data traversing the corresponding ones of the plurality of ports by each of the plurality of first devices.

11. The system of claim 10, wherein the visual indicator is based on whether the alert indication is present for each of the plurality of ports.

12. The system of claim 1, wherein the solicitation is a poll from the second device.

13. A system for monitoring and visualization of network data, comprising:
    a first device comprising a processor; and
    a plurality of second devices coupled to the first device, each of the plurality of second devices comprising a processor being associated with corresponding ones of a plurality of ports, each of the plurality of second devices being configured to determine network traffic analysis information associated with a characteristic of network data traversing each of the plurality of ports in response to a communication from the first device;

the first device being configured to receive a search request implicating the characteristic, to generate the communication based on the search request, to generate a network map including a visual indicator based on the network traffic analysis information, to receive an update of the network traffic analysis information from at least one of the plurality of second devices, and to refresh the visual indicator in real time to reflect the update of the network traffic analysis information: wherein each of the plurality of first devices is configured to determine statistical data over each of a plurality of time intervals of a first time granularity based on the network data; and the statistical data reduces the volume of the network traffic analysis information; and each of the plurality of first devices is configured to determine the network traffic analysis information based on performance of a mathematical operation on the statistical data, wherein the network traffic analysis information is associated with each of a plurality of time intervals of a second time granularity, the first time granularity being finer than the second time granularity.

14. The system of claim 13, wherein each of the plurality of second devices is configured to apply at least one of a signature-based rule and a behavioral rule to the network data to determine the network traffic analysis information in response to the communication from the first device based on the search request.

15. The system of claim 13, wherein the visual indicator is based on a number of times that the characteristic has been detected in the network data over a time interval.

16. The system of claim 15, wherein the characteristic is indicated based on at least one of an occurrence of a bit pattern in the network data and an occurrence of a pattern of variation in a data rate associated with the network data.

17. The system of claim 13, wherein:

the first device is coupled to the plurality of second devices over a network; and each of the plurality of second devices is configured to push the network traffic analysis information across a network independent of a solicitation from the network.

18. The system of claim 13, wherein each of the plurality of second devices is configured to generate an alert indication associated with the corresponding ones of the plurality of ports based on detection of the characteristic in the network data traversing the corresponding ones of the plurality of ports by each of the plurality of second devices.

* * * * *